US009657150B2

(12) United States Patent
Linxian et al.

(10) Patent No.: US 9,657,150 B2
(45) Date of Patent: May 23, 2017

(54) REACTIVE SUPERHYDROPHOBIC SURFACES, PATTERNED SUPERHYDROPHOBIC SURFACES, METHODS FOR PRODUCING THE SAME AND USE OF THE PATTERNED SUPERHYDROPHOBIC SURFACES

(71) Applicant: Karlsruher Institut für Technologie, Karlsruhe (DE)

(72) Inventors: Li Linxian, Eggenstein-Leopoldshafen (DE); Li Junsheng, Eggenstein-Leopoldshafen (DE); Levkin Pavel, Eggenstein-Leopoldshafen (DE); Du Xin, Eggenstein-Leopoldshafen (DE); Feng Wenqian, Eggenstein-Leopoldshafen (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 0 days.

(21) Appl. No.: 14/725,238

(22) Filed: May 29, 2015

(65) Prior Publication Data
US 2015/0344652 A1    Dec. 3, 2015

(30) Foreign Application Priority Data
Jun. 3, 2014   (DE) .................. 10 2014 008 118

(51) Int. Cl.
*C08J 7/18*    (2006.01)
*B05D 5/08*    (2006.01)
*B05D 1/18*    (2006.01)

(52) U.S. Cl.
CPC ............... *C08J 7/18* (2013.01); *B05D 1/185* (2013.01); *B05D 5/08* (2013.01); *B05D 2490/60* (2013.01); *C08J 2333/14* (2013.01); *Y10T 428/24802* (2015.01)

(58) Field of Classification Search
CPC .............................. C08J 7/18; C08J 2338/14
See application file for complete search history.

(56) References Cited

PUBLICATIONS

Ryan M. Hensarling, Vanessa A. Doughty, Justin W. Chan, and Derek L. Patton. "Clicking" Polymer Brushes with Thiol•yne Chemistry: Indoors and Out. 2009. J. Am. Chem. Soc. 131. pp. 14673-14675.*

(Continued)

*Primary Examiner* — Dah-Wei D Yuan
*Assistant Examiner* — Kristen A Dagenais
(74) *Attorney, Agent, or Firm* — McDonnell Boehnen Hulbert & Berghoff LLP

(57) ABSTRACT

The present invention generally relates to methods for modifying and/or producing superhydrophobic surfaces. In particular, the present invention relates to reactive superhydrophobic surfaces which can be modified so as to produce superhydrophobic surfaces having patterns of different chemical functionalities or physical properties such as superhydrophilic-superhydrophobic micropatterns, and uses of these patterned superhydrophobic surfaces as self-cleaning coatings, anti-fouling coatings, or slippery coatings, or for chemical, biological and diagnostic applications, as well as methods for producing the same.

8 Claims, 21 Drawing Sheets

(56) References Cited

PUBLICATIONS

Benjamin D. Fairbanks, Evan A. Sims, Kristi S. Anseth, and Christopher N. Bowman. Reaction Rates and Mechanisms for Radical, Photoinitated Addition of Thiols to Alkynes, and Implications for Thiol-Y ne Photopolymerizations and Click Reactions. Apr. 6, 2010. American Chemical Society. pubs.acs.org/Macromolecules. 43. pp. 4113-4119.*

Massi et al., "Thiol-yne coupling: revisiting old concepts as a breakthrough for up-to-date applications," Organic & Biomolecular Chemistry, 2012, pp. 3791-3807, vol. 10.

* cited by examiner

50 μm

20 μm

10 μm

REACTIVE SUPERHYDROPHOBIC SURFACES, PATTERNED SUPERHYDROPHOBIC SURFACES, METHODS FOR PRODUCING THE SAME AND USE OF THE PATTERNED SUPERHYDROPHOBIC SURFACES

This application claims priority from German application no. 10 2014 008 118.4, filed Jun. 3, 2014, which is incorporated by reference in its entirety.

FIELD

The present invention generally relates to methods for modifying and/or producing superhydrophobic surfaces. In particular, the present invention relates to reactive superhydrophobic surfaces which can be modified so as to produce superhydrophobic surfaces having patterns of different chemical functionalities or physical properties such as superhydrophilic-superhydrophobic micropatterns, and uses of these patterned superhydrophobic surfaces as self-cleaning coatings, anti-fouling coatings, or slippery coatings, or for chemical, biological and diagnostic applications, as well as methods for producing the same.

BACKGROUND

Generally, surface properties can be classified into hydrophobic and hydrophilic surfaces depending on the value of the water contact angle (WCA). A surface having a WCA greater than 90° is referred as hydrophobic, whereas a WCA smaller than 90° is referred as hydrophilic. Maximum water contact angle on a smooth surface is about 120°. In practice, two types of WCA values are used: static and dynamic. Static water contact angles ($\theta_{st}$) are obtained by sessile drop measurements, where a drop is deposited on the surface and the value is obtained by a goniometer or a specialized software. Dynamic contact angles are non-equilibrium contact angles and are measured during the growth (advancing WCA $\theta_{adv}$) and shrinkage (receding WCA $\theta_{rec}$) of a water droplet. The difference between $\theta_{adv}$ and $\theta_{rec}$ is defined as contact angle hysteresis (CAH).

Superhydrophobic surfaces are characterized by extreme water repellency with WCAs greater than 150°, and a CAH of less than 10°. On the contrary, water spreads immediately on superhydrophilic surfaces leading to WCAs less than 10°. Both superhydrophobicity and superhydrophilicity are the result of a combination of high surface roughness with either hydrophobic or hydrophilic material, respectively. Combining these two extreme properties on the same surface in precise two-dimensional micropatterns opens exciting new functionalities and possibilities in a wide variety of applications from cell,[1-3] droplet,[2,4] and hydrogel microarrays[2,5] for screening to surface tension-confined microfluidic channels for separation and diagnostic devices.[6]

Further, continuous superhydrophobic coatings are of high importance for different industrial applications ranging from self-cleaning, anti-icing or anti-corrosion coatings to membranes for oil-water separations or clothing coatings. Most of such superhydrophobic coatings have to be applied to large areas and do not need to be further functionalized. However, for example biotechnological and biomedical applications commonly require superhydrophobic coatings that can be further modified to create nano- to micro-patterns of either different chemical functionalities or physical properties, such as the aforementioned superhydrophobic-superhydrophilic micropatterns. For example, in US 2007/0135007 A1 and WO 2004/113456 A2, methods for producing superhydrophobic coatings are described employing alkyl silanes to fabricate the respective coatings. However, if alkyl silanes are present on the surface, post-functionalization on the coated surface is not easy to be achieved as the alkyl silane coated surface is stable, thereby needing very harsh conditions to post-modify the surface.

A number of methods for making superhydrophobic-superhydrophilic micropatterns have been described over the past decade. For example, methods based on UV-induced decomposition of hydrophobic coatings on different substrates, such as alumina, TiO2 film or SiO2, were reported.[7] Photoinduced modification of carbon nanotubes with hydrophilic azides,[8] plasma treatment,[9] microprinting,[10] or mussel-mimetic deposition of dopamine in combination with soft-lithography[11] have been described. Recently, a method based on UV-initiated photografting for making superhydrophobic-superhydrophilic micropatterns on porous polymer films has been described[1,12], as it is also disclosed in EP 2 481 794 A1. Further, an amine reactive superhydrophobic surface that permits post-fabrication by amine-functionalized molecules has been reported.[13]

Most of the described methods, however, proceed slowly as, for instance, an irradiation time of 30 min is required in the case of the UV-initiated photografting approach described in EP 2 481 794 A1. Moreover, the above-mentioned methods lack the ability to easily tailor or modify the properties by different target functional groups, or require harsh conditions (e.g. plasma treatment or UV-induced decomposition), organic solvents (i.e. incompatible with aqueous conditions) and, therefore, cannot be directly applied to make patterns of biomolecules. These limitations restrict the range and number of possible practical applications of produced superhydrophobic-superhydrophilic micropatterns.

Moreover, methods based on physisorption of hydrophilic chemicals on superhydrophobic surfaces to create hydrophilic patterns usually suffer from short term stability of such coatings. Another approach to achieve controllable and facile functionalization of a superhydrophobic surface is to introduce reactive functional groups into the superhydrophobic coating. However, the presence of reactive functional groups often leads to the increase in surface energy, resulting in the loss of superhydrophobicity.

Principally, besides meeting several requirements, such as having sufficient transparency and a flat topography, another important criterion for microarrays and cell arrays, respectively, is that the spot density should be sufficiently high. However, by increasing the spot density so as to provide, for instance, a genome-on-a-chip cell array, several challenges still exist. Firstly, with increasing spot density and thus, decreasing the distance between spots, cross contamination becomes a serious problem. Secondly, high density packing of the spots requires non-circular (e.g. square) geometry of the spots, which sets additional constraints on the ability to control surface chemistry. The spot size depends, inter alia, on the surface tension of spotting solutions that may differ from one probe-molecule-cocktail to another. This may lead to the variation of the spot size and therefore limits the minimum distance between spots. Another serious problem, arising from the high proximity of spots in a high-density cell array, is the migration of transfected cells between adjacent spots that causes growing systematical errors with smaller spot-to-spot distance. Developing a universal method that is facile, versatile, as well as provides good optical and chemical surface properties remains a big challenge.

SUMMARY

Thus, the problem underlying the present invention is to provide a method by which superhydrophobic surfaces can be easily modified and/or produced, while overcoming the aforementioned drawbacks of the techniques known in the art. In particular, the problem underlying the present invention is to provide reactive superhydrophobic surfaces which can be easily modified so as to produce superhydrophobic surfaces having patterns of different chemical functionalities or physical properties such as superhydrophilic-superhydrophobic micropatterns, which can be used on the one hand as specific coatings and on the other hand in chemical, biological and diagnostic applications, e.g. for droplet microarrays, hydrogel microarrays, microarrays of chemicals or cell microarrays, as well as a respective manufacturing process therefor.

In addition, the reactive superhydrophobic surface coating should be mechanically stable, optionally biocompatible, and should not degrade within a reasonable time-span, while being produced efficiently, particularly in short time and allowing the size and density of the pattern to be precisely controlled. Further, in case of a micropattern for e.g. droplet microarrays, hydrogel microarrays, microarrays of chemicals or cell microarrays, the modified superhydrophobic surface coating should exhibit improved properties such as being capable to prevent cross contamination between adjacent spots and being capable to eliminate e.g. cell migration between adjacent spots, while allowing high data-quality and investigation with common screening techniques.

The solution to the above technical problem is achieved by the embodiments characterized in the claims. In particular, the present invention provides a method for modifying a surface of a substrate to form a superhydrophobic surface at least on parts of the substrate, comprising a functionalization step of functionalizing at least the surface of the substrate by covalently binding an alkyne or alkene group-containing compound thereto, and a first modification step of modifying the alkyne or alkene functionalized surface by reacting the alkyne or alkene groups with at least one first compound, selected from the group consisting of thiols, disulfides and tetrazoles, wherein the first modification step is carried out at least on parts of the surface of the substrate and under UV irradiation, and wherein superhydrophobic areas on the surface are formed in the functionalization step and/or first modification step.

The water layer protects the superhydrophilic regions from being impregnated with the hexadecane solution (right). Scale bars are 1 mm.

Figure 13:
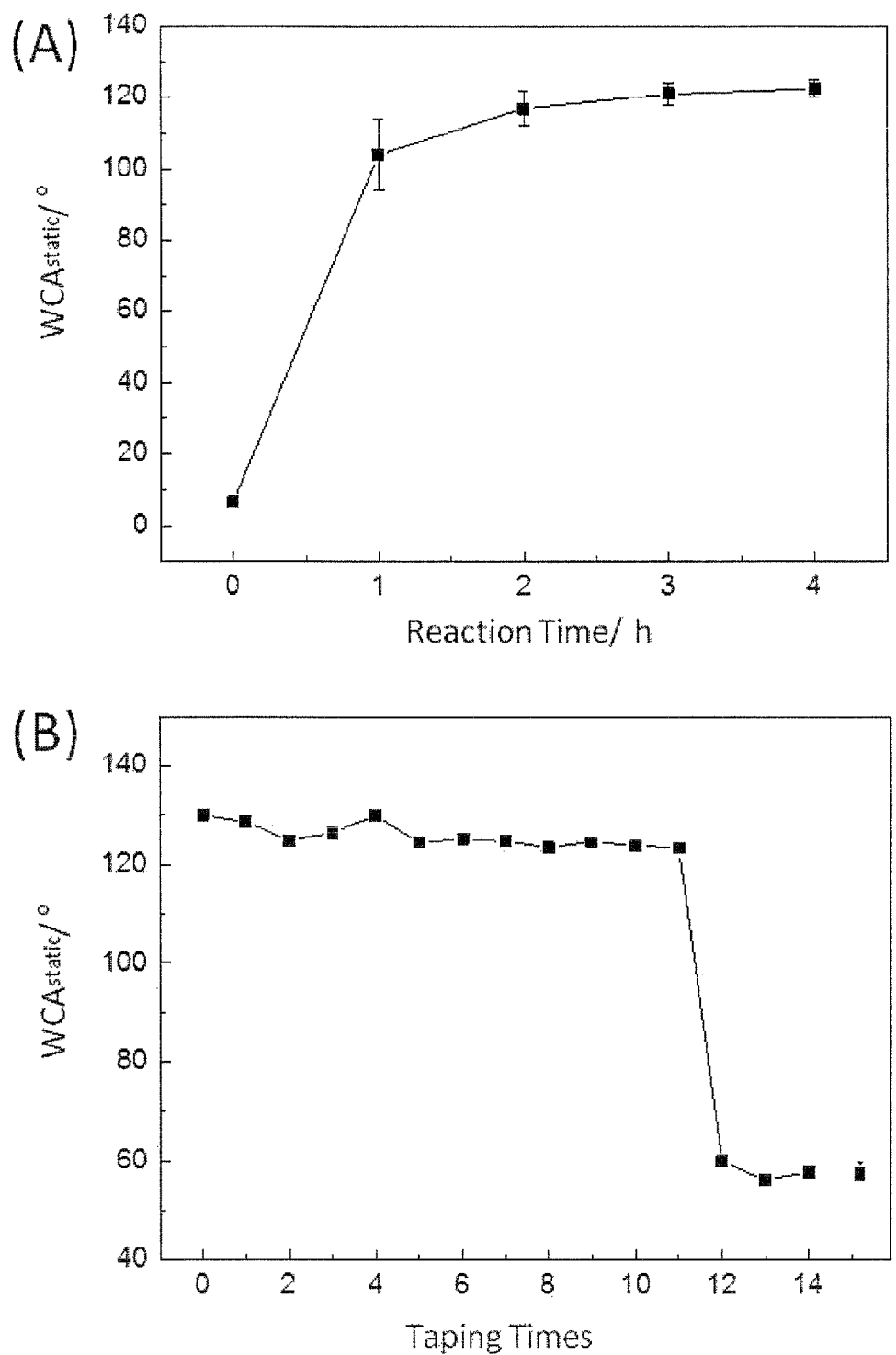

FIG. 13: (A) The esterification progress was characterized by measuring the static WCA on the polymer layer during the esterification. The graph shows the increase of the static WCA on the porous polymer layer as a function of the reaction time. The static WCA on the surface is still about 124° after 24 h of the reaction time. (B) To characterize the esterification within the porous polymer, the superficial surface layer was removed by attaching conventional pressure-sensitive tape (Scotch tape) to the polymer layer and then peeling it off layer by layer. After each layer was removed with the tape, static WCA was measured at the same spot on the polymer film (esterification for 4 h). The isolated spot far right shows the static WCA of a bare glass substrate. After taping 11 times, the polymer layer shows the same static WCAs as a bare glass substrate, indicating that the esterification reaction takes place throughout the whole thickness of the polymer layer. Five different spots were measured all showing the same trend.

Figure 14:
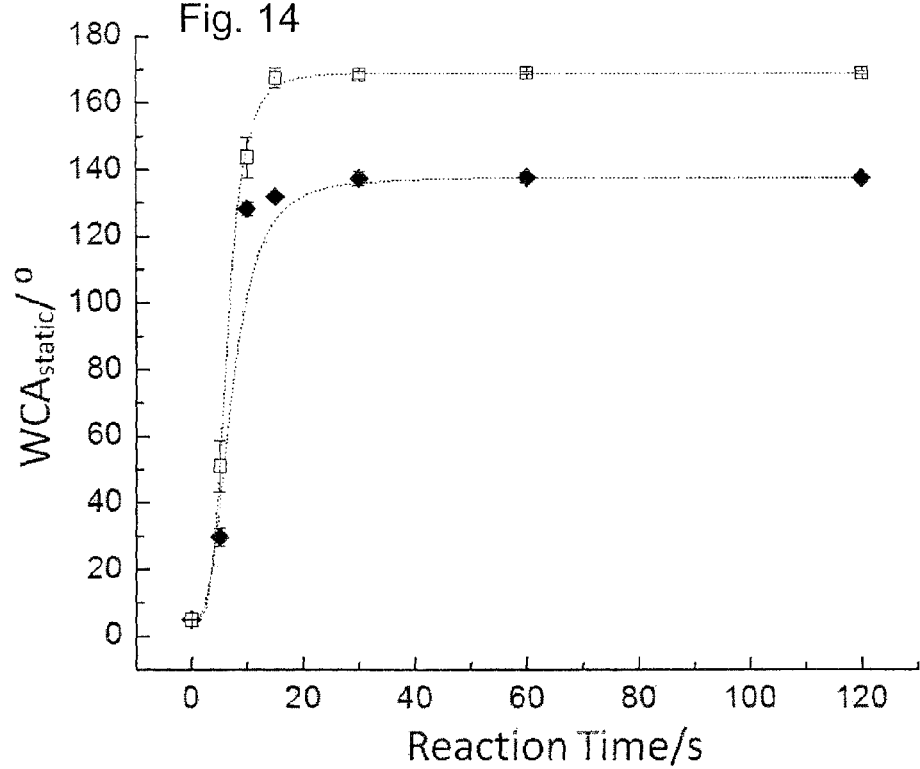

FIG. 14: The alkene modification progress was characterized by measuring the static WCA on the polymer layer. The line (◆) shows the increase of the static WCA on the porous polymer layer as a function of the reaction time. The line (□) shows the increase of the static WCA on the porous polymer layer after a second modification by 1H,1H,2H,2H-perfluorodecanethiol.

Figure 15:
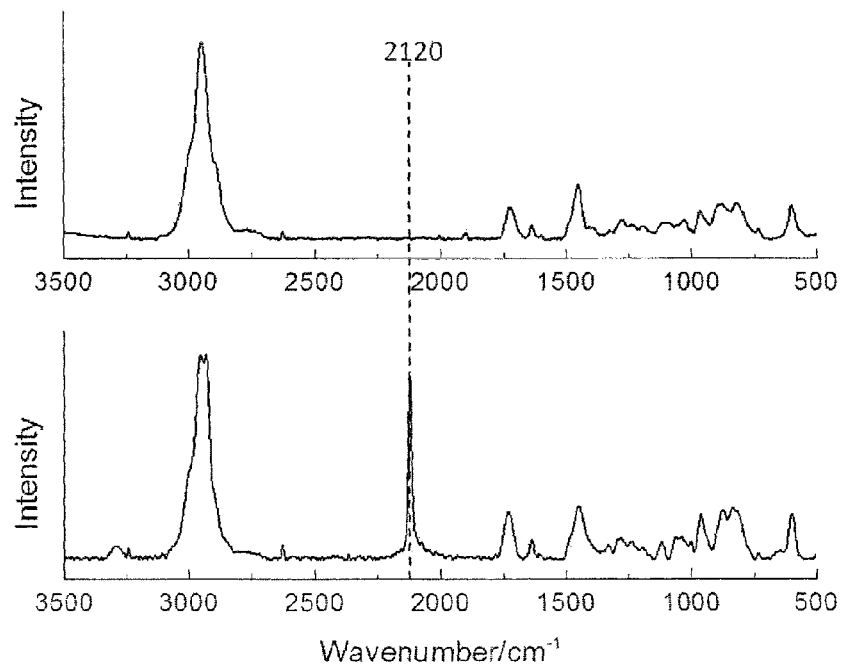

FIG. 15: Raman spectra of the HEMA-EDMA polymer surface (top) and a 4-pentynoic acid-functionalized alkyne polymer surface (bottom). The intense band at ~2120 cm$^{-1}$ supports the presence of —C≡C—H units on the alkyne surface.

Figure 16:
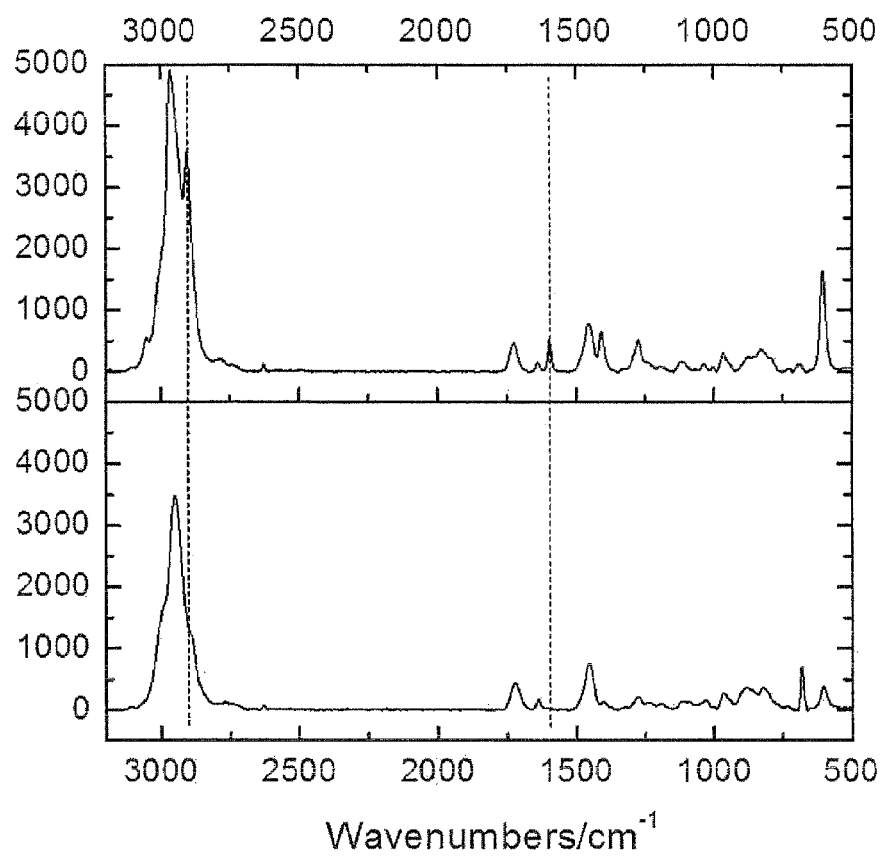

FIG. 16: Raman spectra of the HEMA-EDMA polymer surface (bottom) and a chloro(dimethyl)vinylsilane-functionalized alkene polymer surface (top). The intense band at 1600 cm$^{-1}$ supports the presence of —C=CH$_2$ units on the alkene surface.

Figure 17:
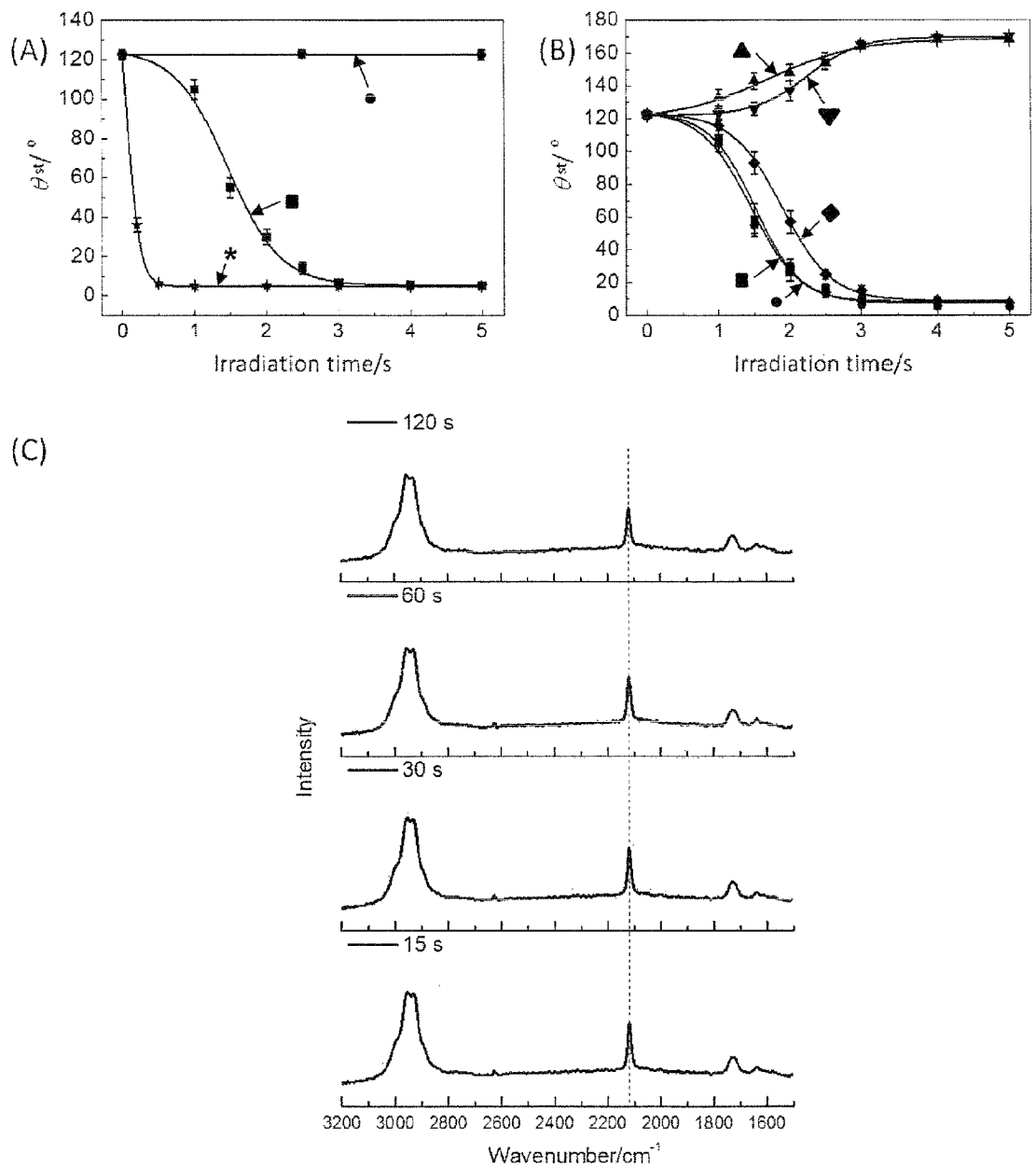

FIG. 17: (A, B) Kinetics of the alkyne surface modification using the thiol-yne click chemistry. The $\theta_{st}$ of the alkyne functionalized porous polymer layer modified using: (A) cysteamine with (★) or without (■) photoinitiator 2,2-dimethoxy-2-phenylacetophenone (DMPAP) and with DMPAP but without UV irradiation (●); (B) cysteamine (■), 3-mercaptopropionic acid (●), 2-mercaptoethanol (◆), 1H,1H,2H,2H-perfluorodecanethiol (▼), and 1-dodecanethiol (▲) without DMPAP upon UV irradiation; (C) The Raman spectra of cysteamine-modified alkyne surfaces at different UV irradiation times. The band ratio of ~2940 cm$^{-1}$ (C—H alkyl free vibrations) to ~2120 cm$^{-1}$ (C≡C triple bond stretch) remains the same, illustrating that 15 s is enough for the alkyne complete functionalization of the alkyne groups with thiols.

Figure 18:
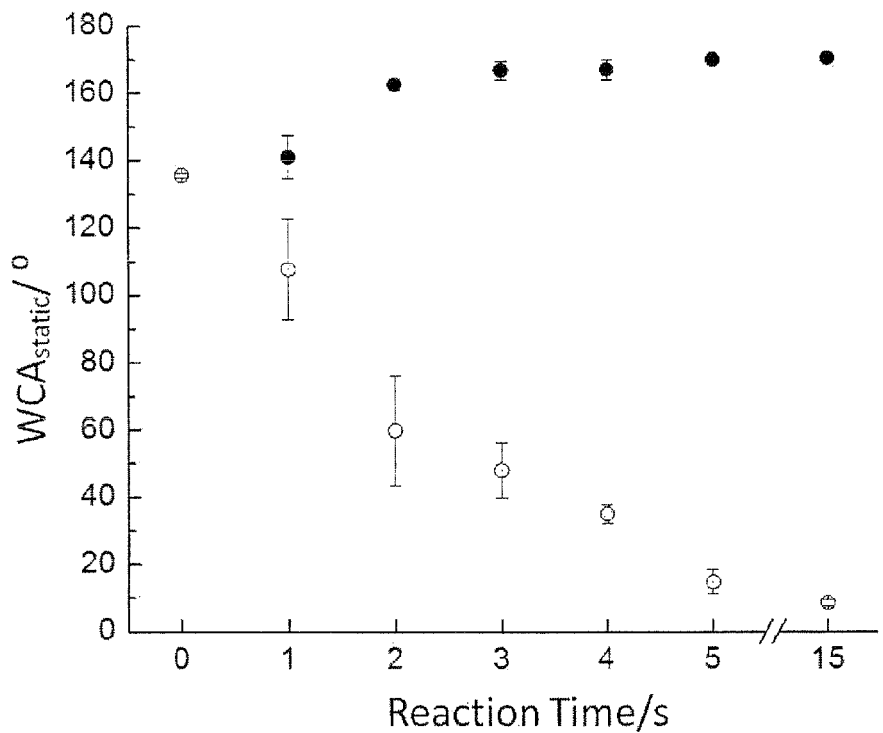

FIG. 18: Kinetics of the alkene surface modification using the thiol-ene click chemistry. The $\theta_{st}$ of the alkene functionalized porous polymer layer modified using cysteamine (○) and 1H,1H,2H,2H-perfluorodecanethiol (●).

Figure 19:
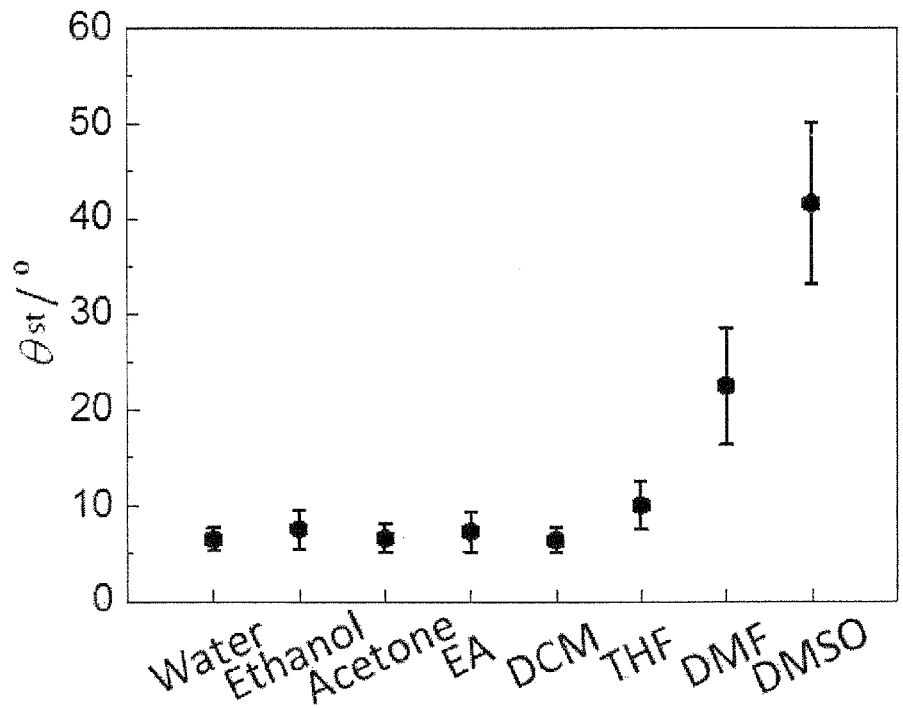

FIG. 19: $\theta_{st}$ of the alkyne surfaces functionalized using 3-mercaptopropionic acid dissolved in different solvents; no photoinitiator; 5 s UV irradiation; measured from 3 different samples with each two measurements on every sample.

Figure 20:
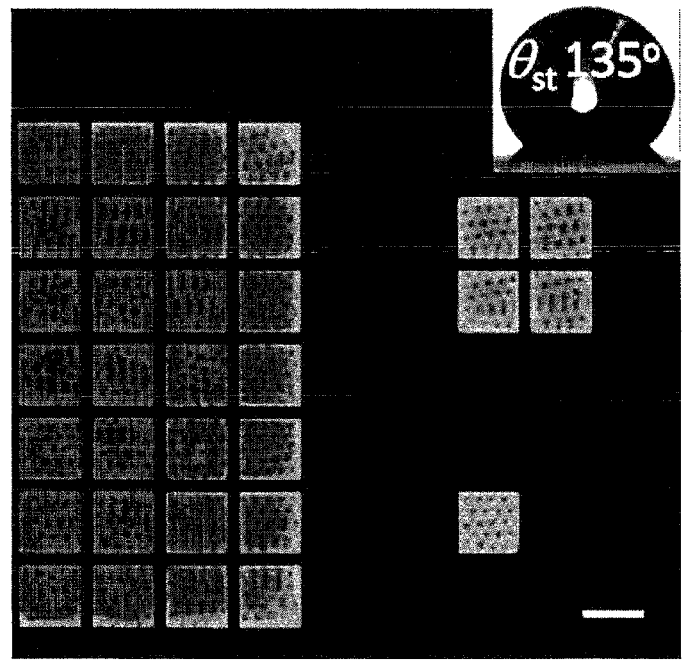

FIG. 20: Superhydrophobic micropattern, with alkyne-functionalized squares and superhydrophobic 1H,1H,2H,2H-perfluorodecanethiol-modified barriers. The alkyne spots are wetted with ethanol-water solution containing Rhodamine B. The dye solution can only wet the alkyne spots and is repelled by the superhydrophobic barrier. No leaking occurs outside of the single spot containing the dye solution. Insert: a droplet of 1:1 ethanol:water solution on a 1H,1H,2H,2H-perfluorodecanethiol modified superhydrophobic surface. The static water contact angle is 135°. Scale bar 1 mm.

Figure 21:
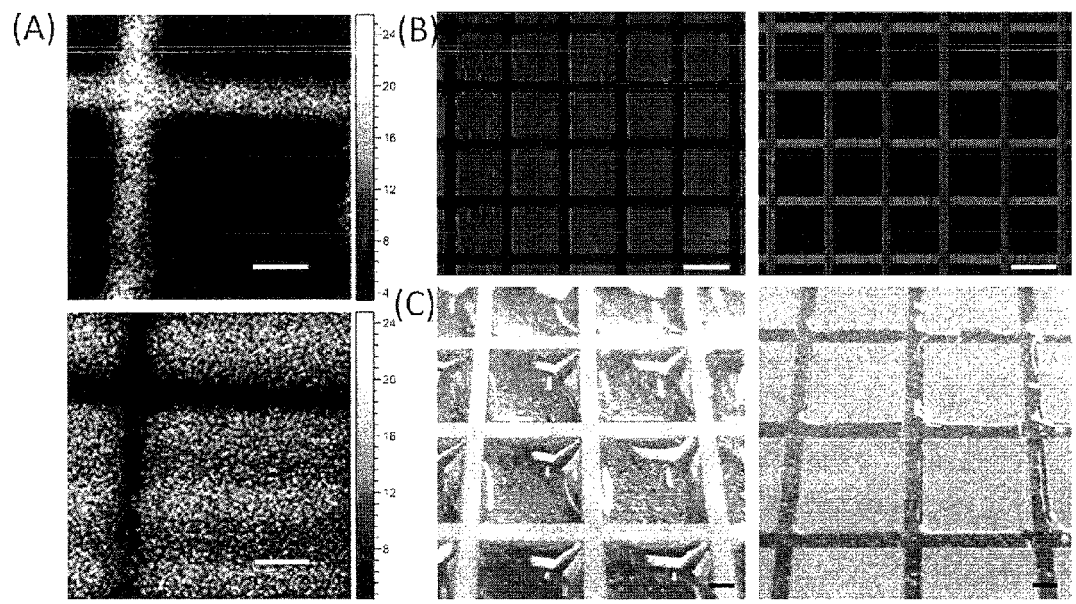

FIG. 21: (A) ToF-SIMS 2D graphs of positive CF$^+$-ion and the sum of CH$_4$N$^+$-ion and C$_2$H$_6$N$^+$-ion, showing the patterning of 1H,1H,2H,2H-perfluorodecanethiol and cysteamine, respectively. (B) Fluorescence microscope images showing the inverse superhydrophobic-superhydrophilic patterns filled with aqueous solution of Rhodamine B; (C) The superhydrophilic regions of inverse superhydrophobic-superhydrophilic patterns filled with water. Inverse patterns produced using the same photomask by switching the order in which the hydrophobic and hydrophilic regions were created. Scale bars are 100 μm (A), 300 μm (B) and 1 mm (C).

Figure 22:
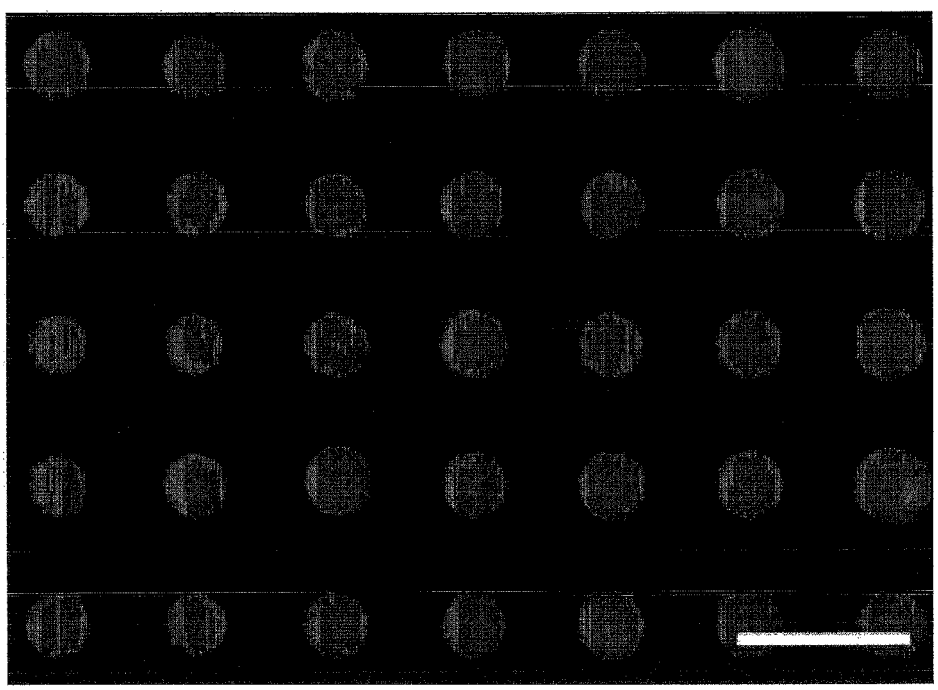

FIG. 22: Fluorescence microscope image of a fluorescein-β-Ala-GGGGC peptide pattern prepared by the thiol-yne reaction on the alkyne porous surface carried out in aqueous solution, scale bar: 500 μm.

Figure 23:
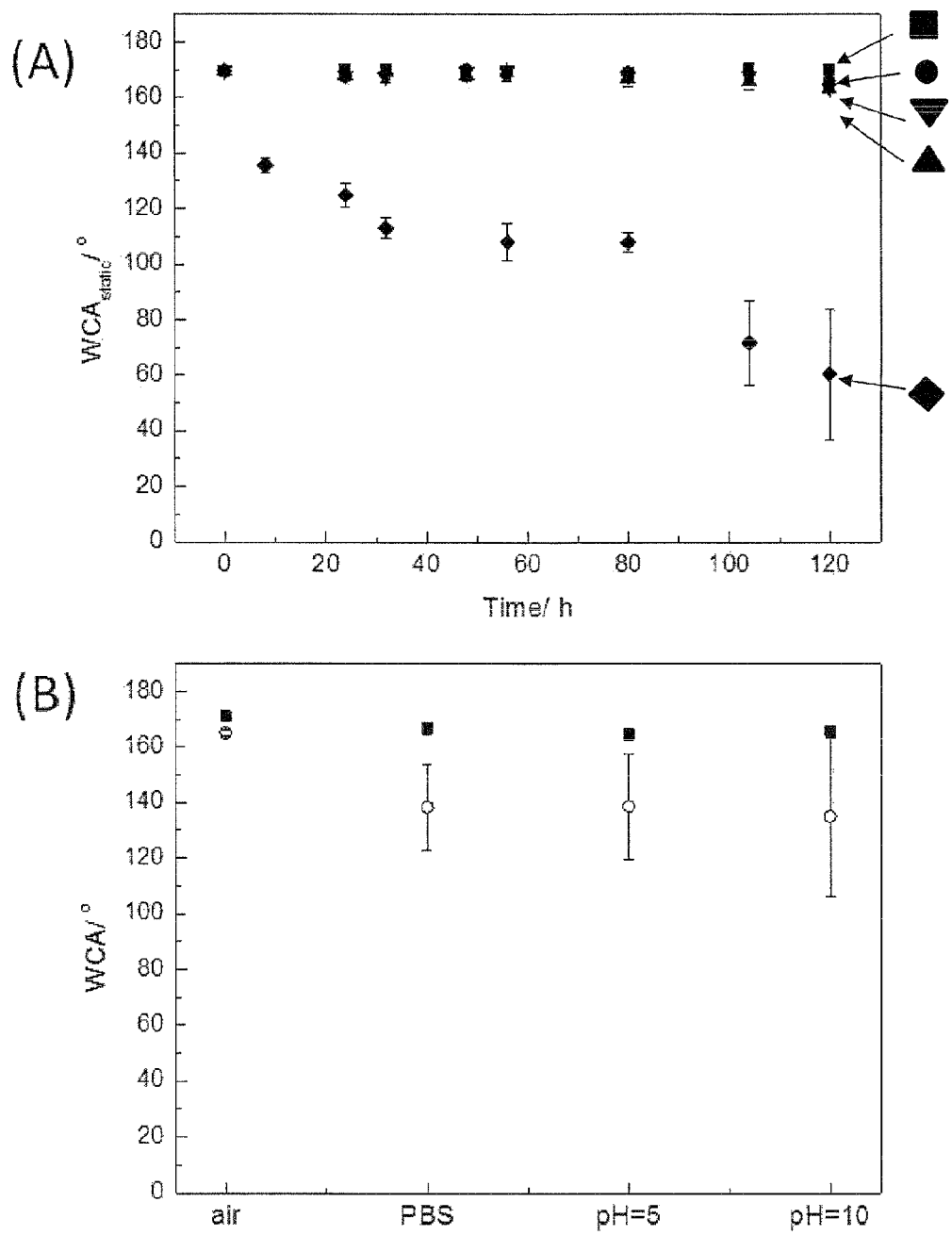

FIG. 23: The stability test of superhydrophobic surfaces in air (■), PBS buffer (●), DMEM solution with 10% FBS (◆) (often used in cell culture), and both acetic (▲) and basic water solutions (▼) (pH=5 and 10) environments for 120 h. A) Static WCAs of superhydrophobic surfaces as a function of the incubation time in different environments. The static WCAs of the surfaces in air, PBS buffer, and acetic and basic water solutions (pH=5 and 10) remained above 160° after 120 h incubation. Due to the protein adsorption, the WCA of the surface in DMEM+FBS solution decreased. B) The advancing (■) and receding (●) WCAs of the surfaces after incubation for 120 h in different environments. The advancing WCAs almost remained the same after incubation. The receding WCAs of the surface in PBS buffer, acetic and basic water solutions decreased slightly.

Figure 24:
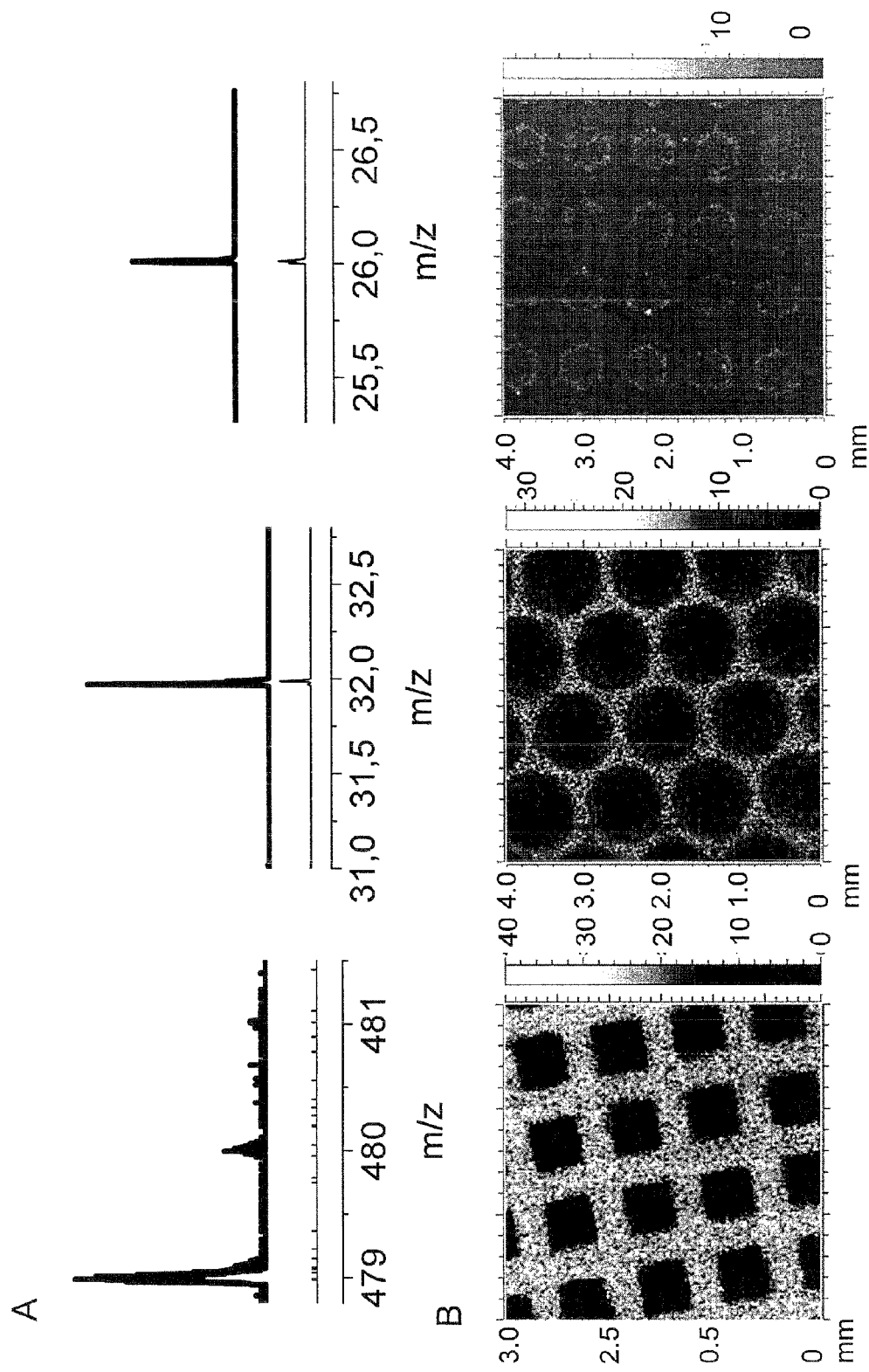

FIG. 24: (A) ToFSIMS spectrum of the 1H,1H,2H,2H-perfluorodecanethiol (left), dibutyl dithiol (middle) and tetrazole (right) modified superhydrophobic VCTS surface. (B) ToFSIMS images of the 1H,1H,2H,2H-perfluorodecanethiol (left), dibutyl dithiol (middle) and 4-(2-phenyl-2H-tetrazol-5-yl)benzoic acid (right) modified superhydrophobic VCTS surface.

Figure 25:
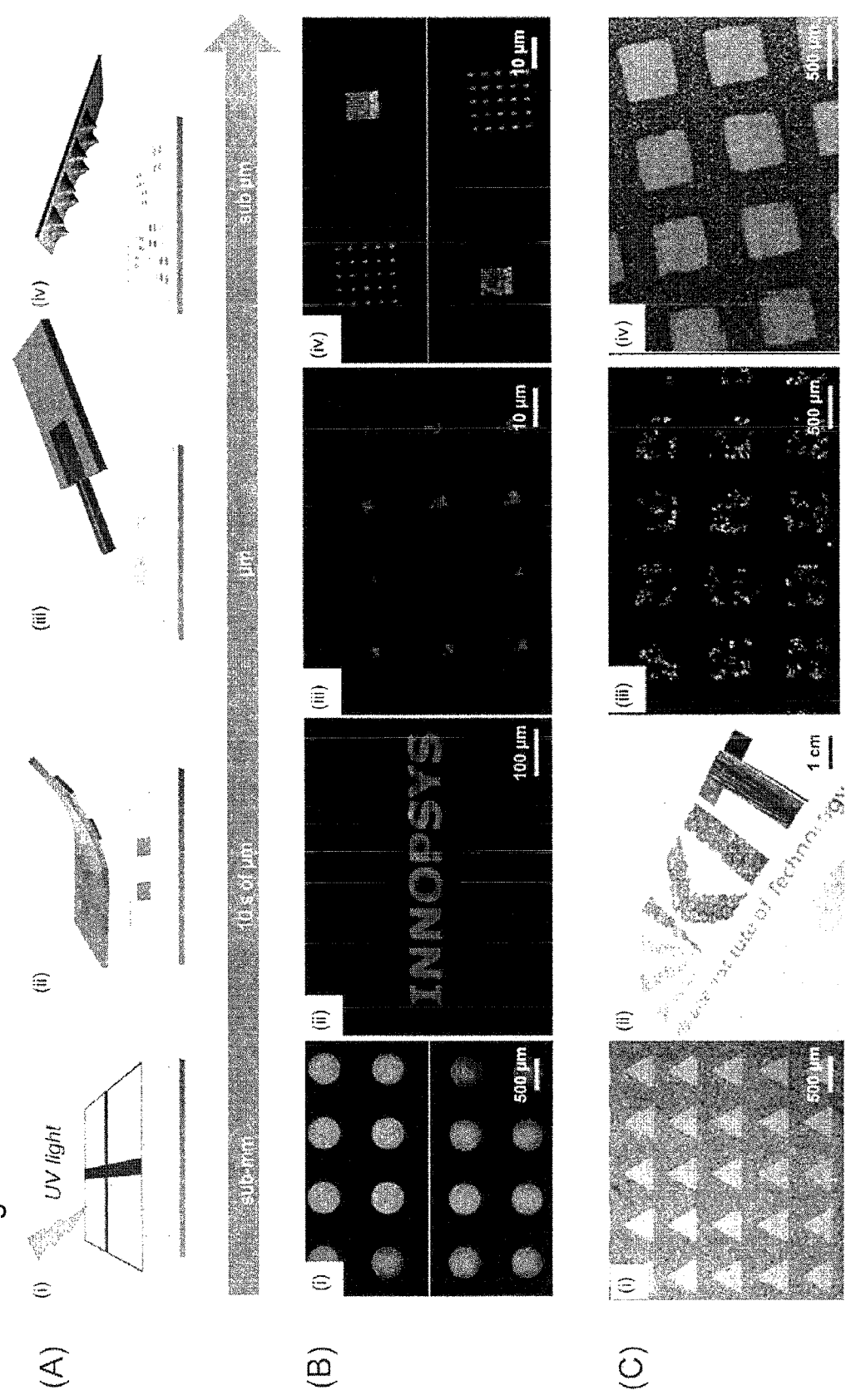

FIG. 25: (A) Schematic representation of different surface patterning method: (i) UV irradiation through photomask; (ii) micro contact printing; (iii) capillary spotting; (iv) dip pen nanolithography (DPN); (B) Fluorescent microscope images of: (i) FITC (top) and Rhodamine B (bottom) confined in hydrophilic spot of a superhydrophobic-superhydrophilic VTCS micropattern; (ii) Rhodamine B-SH pattern printed on VTCS surface via micro contact printing; (iii) FITC-SH pattern on VTCS surface created by capillary spotting; (iv) Patterns of Rhodamine-SH and FITC-SH generated using multiplexed DPN on VTCS surface; (C) (i) a microscope image of a superhydrophobic-superhydrophilic micropattern immersed in water; (ii) a picture showing water droplet array on a superhydrophobic-superhydrophilic micropattern; (iii) patterned HEK 293 cells on a superhydrophobic-superhydrophilic micropattern (pictures were taken 24 hours after cell seeding); (iv) ToFSIMS chemical map of a "double clicked" superhydrophobic-superhydrophilic micropattern (bright: NH$_2$-signal; dark: CF$_3$-signal).

Figure 26:
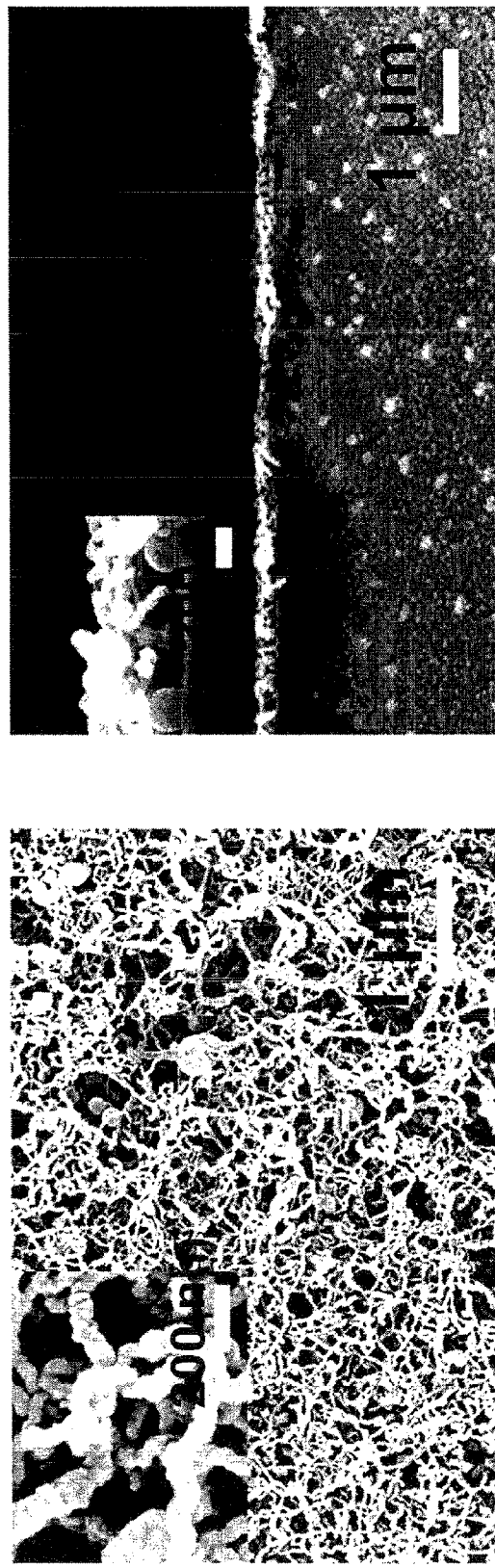

FIG. 26: Surface and cross-section and SEM micrographs of the reactive superhydrophobic surface (scale bar 1 μm in the image, 200 nm in inset)

Figure 27:
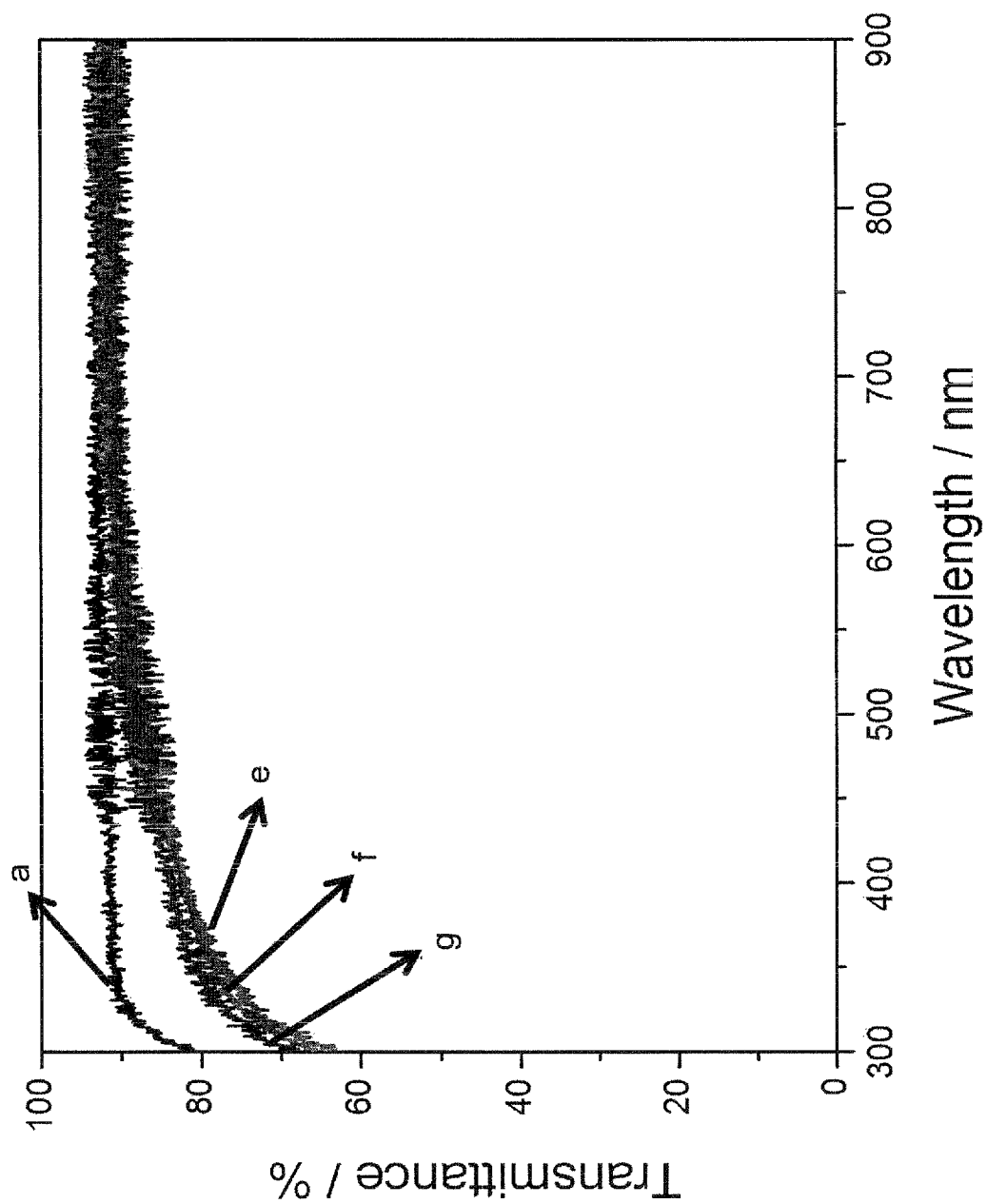

FIG. 27: UV-Vis transmittance spectra of a plain glass substrate (a) and reactive superhydrophobic surface before and after thiol-ene modification ((e) SL surface, (f) olephobic surface, (g) reactive SH surface).

DETAILED DESCRIPTION

According to the present invention, the surface of the substrate functionalized with alkyne or alkene groups can be easily modified under UV irradiation based on photoinduced thiol-yne or thiol-ene reactions, disulfide-yne or disulfide-ene reactions, or tetrazole-yne or tetrazole-ene reactions, respectively, which are hereinafter simply referred to as "photoinduced click-reaction(s)". Said reaction type is also known as "click" chemistry[14], which has been used so-far for example to modify alkyne or alkene-containing polymer brushes[15], and for immobilizing gold nanoparticles on a polymer surface site-specifically[16]. In the aforementioned article relating to the modification of alkyne or alkene-containing polymer brushes (R. M. Hensarling, V. A. Doughty, J. W. Chan, D. L. Patton, *J. Am. Chem. Soc.* 2009, 131, 14673), it is described that the hydrophobicity can be manipulated by modifying the polymer brushes bound to the surface of silicon substrates. Said polymer brushes act as reactive "handles" composed of poly(propargyl methacrylate) and presenting a plurality of functional groups that significantly increase the density such functional groups on the surface. By using such an approach of modifying polymer brushes, it is reported that hydrophobic or hydrophilic surfaces can be obtained.

According to the present invention, however, the functionalization step of functionalizing at least the surface of the substrate by covalently binding an alkyne or alkene group-containing compound thereto excludes the formation of polymer brushes. That means, according to the present invention, the functionalization step of functionalizing at least the surface of the substrate by covalently binding an alkyne or alkene group-containing compound thereto excludes the polymerization of the moiety bound to the surface of the substrate. The "alkyne or alkene group-containing compound" does not relate to polymeric brushes or any precursor to be polymerized, so as to provide a polymer brush, but represents a monomeric moiety. Thus, according to the present invention, the click-reaction of the modification step takes place directly on the surface of the substrate without employing reactive "handles" each having a plurality of functional groups. Surprisingly, despite the absence of a plurality of functional alkyne or alkene groups, it is possible to produce a superhydrophobic surface in form of a coating on a substrate.

Accordingly, the present invention provides a simple and facile method to modify as well as to produce a superhydrophobic surface in form of a coating on a substrate. In particular, the present invention provides reactive and, hence, easily patternable superhydrophobic surfaces, which are preferably transparent. According to the present invention, different functionalities can be easily introduced to the reactive superhydrophobic surface using the aforementioned click chemistry, whereby a desired pattern of different molecules, such as fluorophores, lubricants, biomolecules, such as peptides, and polymers can be obtained. In addition, depending on the nature of the compounds used in the modification step, it is possible to provide a superhydrophilic-superhydrophobic pattern on the surface.

According to the present invention, the term "superhydrophobic" is understood in terms that the static WCA ($\theta_{st}$) of the surface is 150° or higher, and the CAH thereof is 10° or less. The term "superhydrophilic" is understood in terms that the WCA of the surface is 10° or less. In a preferred embodiment of the present invention, the superhydrophobic areas of the modified surface have a WCA of 160° or higher, more preferably of 165° or higher, and most preferably of 168° or higher, expressed in terms of the static WCA ($\theta_{st}$). Also, according to a preferred embodiment of the present invention, superhydrophilic areas of a patterned surface have a WCA of 8° or less, more preferably of 6° or less, and most preferably of 5° or less, expressed in terms of the static WCA ($\theta_{st}$).

The static WCA ($\theta$st) as used within the scope of the present invention is measured by sessile drop measurements, where a drop is deposited on the surface and the value is obtained by using a contact angle goniometer employing a high resolution camera (a UK 1115 digital camera from EHD imaging (Germany)) and software (ImageJ) to capture and analyze the contact angle. The contact angle hysteresis (CAH) is obtained by the difference between $\theta$adv and $\theta$rec.

The superhydrophobicity of the modified surface of the present invention is the result of the combination of the porosity of the substrate or high surface roughness of the substrate with hydrophobic residues incorporated either in the functionalization step and/or modification step. According to the present invention, the superhydrophobic areas on the surface may be formed in the functionalization step and/or first modification step. That means, in the method according to the present invention, a superhydrophobic surface may be generated in the functionalization step, which can be further modified in the subsequent first modification step using the photoinduced click-reaction. In addition, according to the present invention, the superhydrophobic surface may be also generated in the first modification step. In such a case, the surface areas of the substrate which have undergone the functionalization step, whereby an alkyne or alkene group-containing compound is covalently bound to the surface, need not necessarily exhibit superhydrophobic properties.

As mentioned above, the modified surface, which may be also referred to as "modified surface coating", obtained by the method according to the present invention has preferably high transparency at least on the superhydrophobic areas. In particular, according to the present invention, the modified surface coating has preferably a transmittance of 70% or more, more preferably of 80% or more, and most preferably of 85% or more within a wavelength range of 300 nm to 1000 nm.

The substrate is not specifically limited and includes two-dimensional substrates as well as three-dimensional substrates which can be functionalized in that an alkyne or alkene group-containing compound can be covalently bound thereto. In this regard, within the present invention, the covalently binding of the alkyne or alkene group-containing compound to the substrate is understood that the alkyne and alkene groups are still present after the functionalization step, i.e. the binding of the alkyne or alkene group-containing compound to the substrate does not occur via the carbon-carbon double bond (C=C) and carbon-carbon triple bond (C≡C), respectively.

The substrate may be made of any organic or inorganic material, including porous layers or films made of a polymer material, glass material, metallic material and the like (excluding polymeric brushes). In particular, the porous material may be a micro-porous or nano-porous polymer layer, which may be provided on a suitable base material, such as a glass plate supporting the polymer layer. In addition, the substrate may be composed of paper, glass microfibers and silica gel. In addition, the substrate is preferably made of any material, such as polymers or glass, the surface of which can be activated with an oxygen ($O_2$) plasma.

Accordingly, the surface of the substrate to be modified may be porous per se, or a specific surface roughness of the substrate may be created in the functionalization step, such as the formation of nanofilaments. In any case, hereinafter, both alternatives are simply referred to as "alkyne or alkene functionalized porous substrate".

As mentioned above, conventional methods for preparing e.g. superhydrophilic-superhydrophobic micropatterns are very time-consuming and, for instance, in EP 2 481 794 A1, 30 min is given for the required irradiation time in the photografting step. In general, long UV irradiation times can lead to oxidation and degradation of the substrate as well as to the damage of biomolecules used for functionalization. Most of the existing UV-based techniques for the formation of superhydrophobic-superhydrophilic patterns require irradiation times ranging from several minutes to several hours, which limits possible applications of such methods.[7,12]

According to the present invention, the surface modification of the alkyne or alkene functionalized porous substrate using the photoinduced click-reaction is achieved in very short time. Preferably, according to the present invention, the modification using UV irradiation is preferably from 0.25 s to 30 min, more preferably 15 min, 5 min, 2 min, or 1 min or shorter, and even more preferably 40 s or shorter in the first modification step. In particular, in a preferred embodiment, UV irradiation is carried out for 0.25 to 25 s, more preferably 0.5 to 20 s. An irradiation time of 1 to 15 s is particularly preferred. In case the method according to the present invention comprises more than one surface modification steps, as will be described in more detailed below, the aforementioned irradiation times apply to each modification step of modifying the surface of the alkyne or alkene functionalized porous substrate.

According to a preferred embodiment of the present invention, the superhydrophobic areas on the surface are at least formed in the functionalization step using an alkene group-containing compound. Here, the at least one first compound, selected from the group consisting of thiols, disulfides and tetrazoles (hereinafter simply referred to as "photo-clickable compounds"), used in the first modification step contains at least one functional moiety different from the alkene group-containing compound, thereby creating a pattern of superhydrophobic areas on the surface. For the first modification step, it is preferred to use a photomask to precisely control the pattern to be generated. According to said embodiment, it is possible to use photo-clickable compounds having any desired functional moiety attached, such as fluorophores, biomolecules, such as peptides, and polymers. In addition, according to the present invention, besides using a photomask, it is possible to create high resolution patterns, preferably nanopatterns, on the photo-clickable superhydrophobic surface by direct writing using e.g. capillary spotting or Dip-Pen Nanolithography (DPN) which enables direct deposition of nanoscale materials onto the substrate in a flexible manner. Based thereon, a patterning resolution down to sub-micro scale can be achieved on the superhydrophobic surface.

Figure 1:
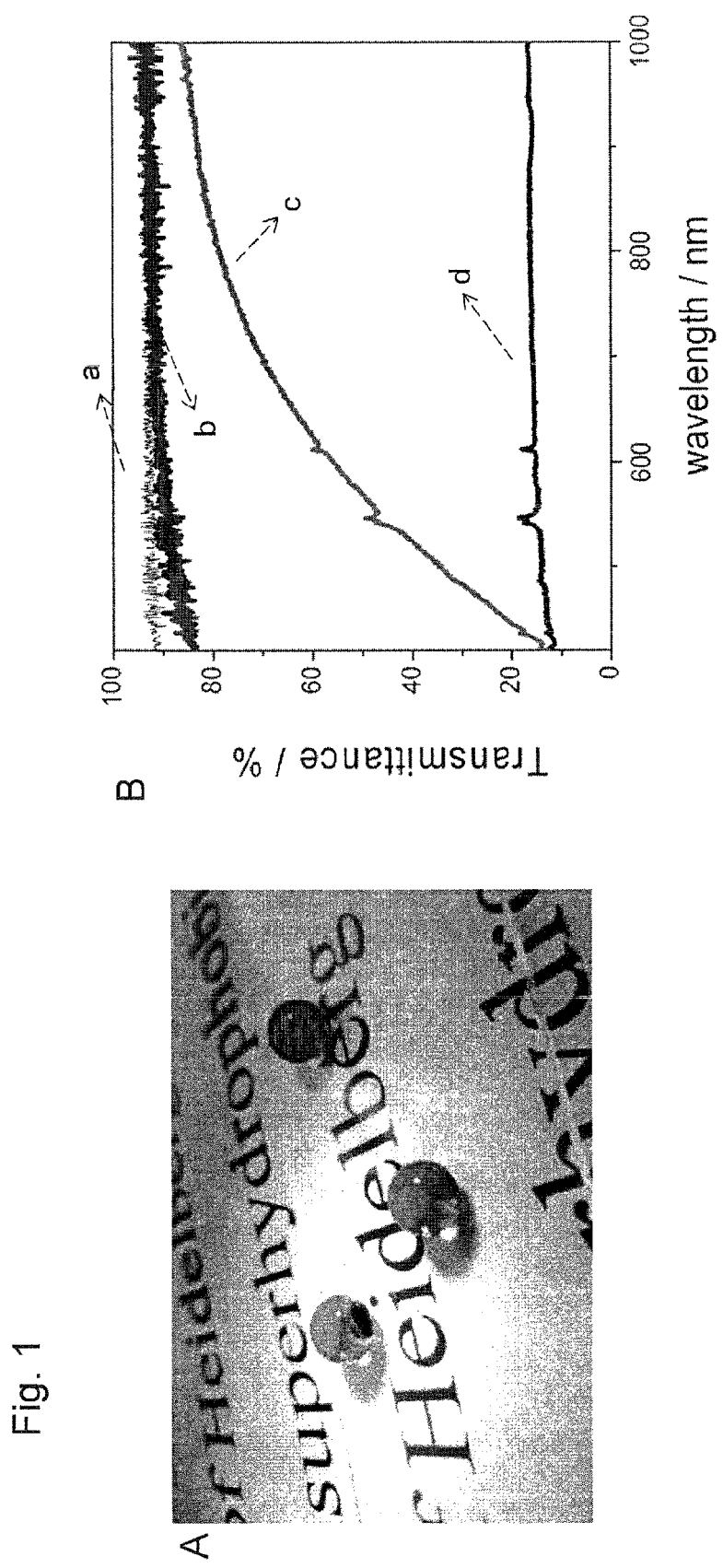
FIG. 1: Transparent and reactive properties of the superhydrophobic coating functionalized using trichlorovinyl silane (VCTS substrate) of (A) water droplets on the surface having vinyl groups bound thereto (VCTS substrate); (B) UV-Vis transmittance spectra of a plain glass substrate (a), VCTS substrate (b), a superhydrophobic photografted HEMA-EDMA surface (c), and BMA-EDMA surface (d) (all polymer surfaces were prepared on glass substrates); (C) schematic representation showing the clickable group on the VCTS surface; (D) schematic representation of the photoinduced click-reactions by way of a thiol-ene reaction (left), disulfide-ene reaction (middle) and tetrazole-ene reaction (right).
Figure 1:
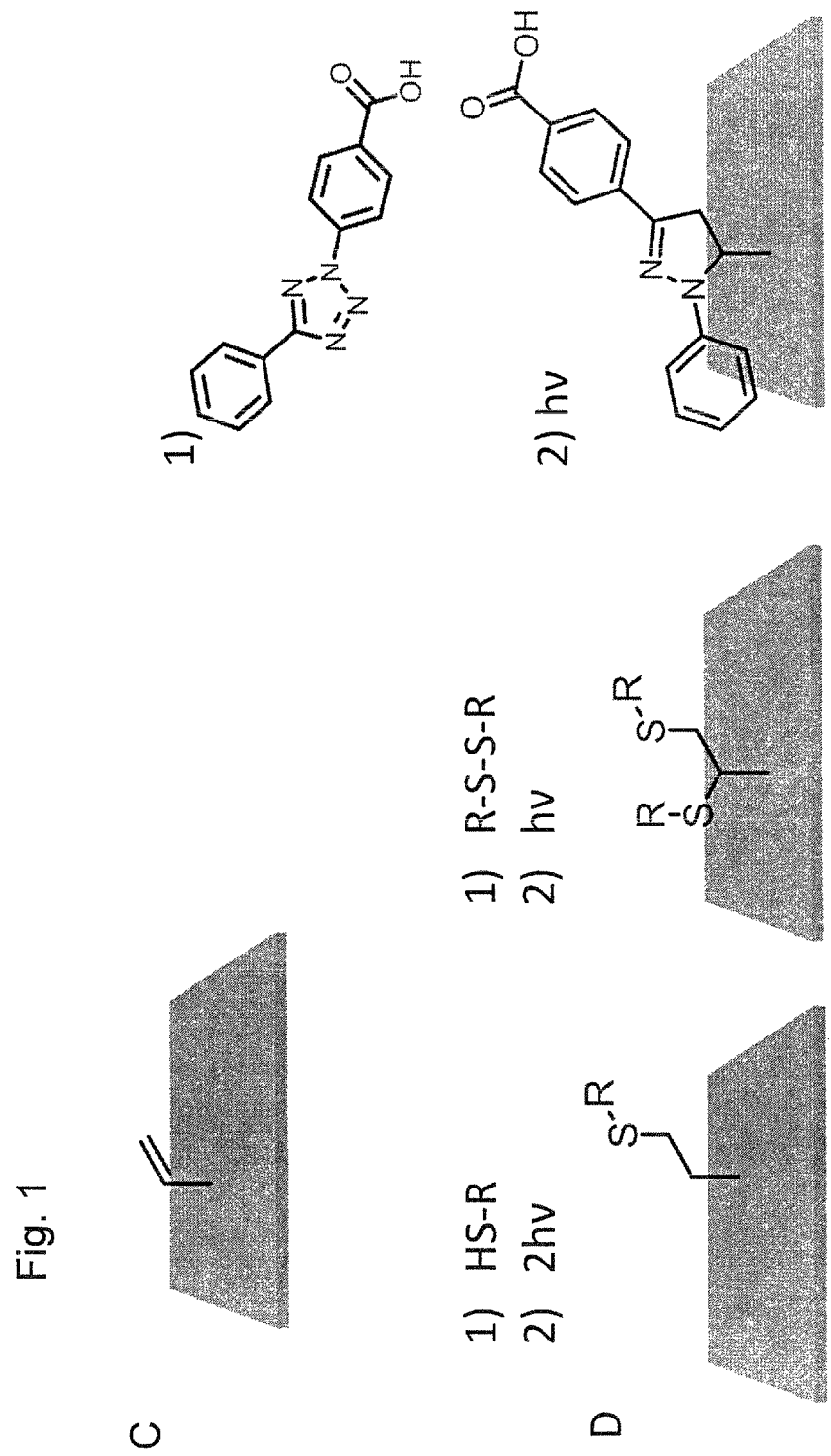

According to the present invention, it is particularly preferred to use a silicon-containing compound having at least one vinyl group as the alkene group-containing compound in the functionalization step. According to the present invention, when using a silicon-containing compound having at least one vinyl group, such as trichlorovinyl silane, it is possible to provide a transparent superhydrophobic surface on the substrate, as it is schematically illustrated in FIG. 1. Modification of the transparent surface with the photo-clickable compounds can thus be easily achieved.

Accordingly, the present invention also provides a transparent substrate having a superhydrophobic surface based on silicon nanofilaments having vinyl groups covalently bound on the surface capable to be modified by reacting with at least one first compound, selected from the group consisting of thiols, disulfides and tetrazoles, using UV irradiation. Preferably, the photo-clickable and transparent superhydrophobic surface is based on silicone nanofilaments bearing said reactive vinyl groups.

According to another preferred embodiment of the present invention, the method for modifying the surface of the substrate further comprises a second modification step of modifying unmodified areas of the alkyne or alkene functionalized surface by reacting unreacted alkyne or alkene groups with at least one second compound, selected from the group consisting of thiols, disulfides and tetrazoles, wherein the second modification step is carried out under UV irradiation on parts of the surface of the substrate not modified in the first modification step. Thus, the method according to the present invention may comprise a first modification step and a second modification step, wherein the first modification step is preferably carried out using a photomask. Based thereon, it is possible to easily modify (post-functionalize) superhydrophobic surfaces to provide a patterned surface.

In particular, according to the present invention, it is preferred that the first modification step of modifying the alkyne or alkene functionalized surface is carried out by reacting the alkyne or alkene groups with the first compound represented by the general formulae $R^1$—SH, $R^1$—S—S—$R_x$, or $R^1$-Tz-$R_x$ using a photomask, thereby creating a pattern of superhydrophilic areas on the surface, and the second modification step of modifying the unmodified areas of the alkyne or alkene functionalized surface is carried out by reacting the unreacted alkyne or alkene groups with the second compound represented by the general formulae $R^2$—SH, $R^2$—S—S—$R_x$, or $R^2$-Tz-$R_x$, thereby creating superhydrophobic areas on the surface, wherein $R^1$, $R^2$ and $R_x$ represent either hydrophilic or hydrophobic residues and Tz represents a tetrazole moiety.

Alternatively, the first modification step of modifying the alkyne or alkene functionalized surface may be carried out by reacting the alkyne or alkene groups with the first compound represented by the general formulae $R^1$—SH, $R^1$—S—S—$R_x$, or $R^1$-Tz-$R_x$ using a photomask, thereby creating a pattern of superhydrophobic areas on the surface, and the second modification step of modifying the unmodified areas of the alkyne or alkene functionalized surface is carried out by reacting the unreacted alkyne or alkene groups with the second compound represented by the general formulae $R^2$—SH, $R^2$—S—S—$R_x$, or $R^2$-Tz-$R_x$, thereby creating superhydrophilic areas on the surface, wherein $R^1$, $R^2$ and $R_x$ represent either hydrophilic or hydrophobic residues and Tz represents a tetrazole moiety. Based thereon, it is possible to produce superhydrophilic-superhydrophobic surfaces having a specific pattern.

Figure 2:
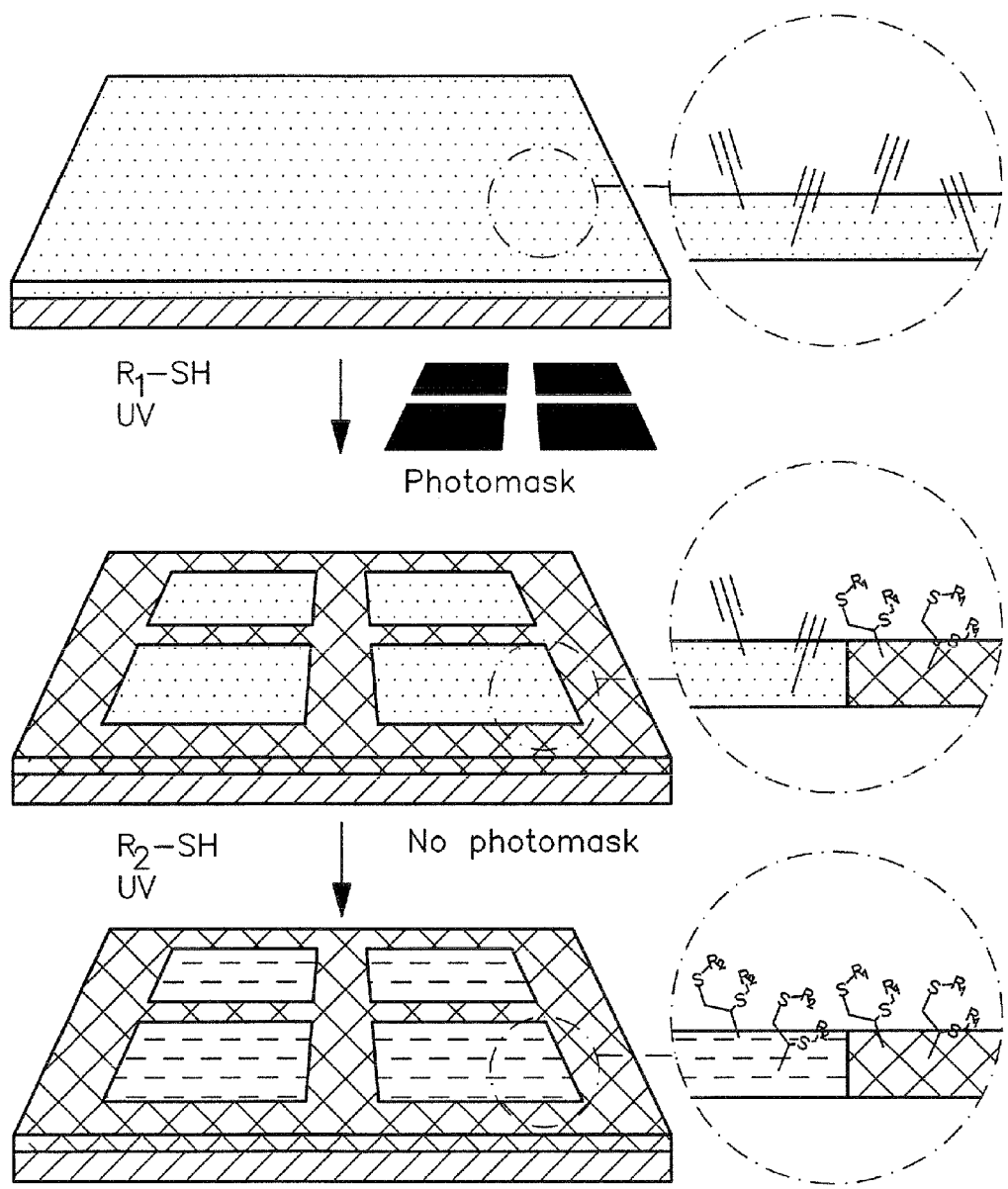
FIG. 2: Schematic representation of the photoinduced click-reactions by way of a thiol-yne photo-click reaction for creating superhydrophobic-superhydrophilic patterns using an alkyne-modified porous polymer layer as a substrate.

Thus, according to the present invention, the surface of the alkyne or alkene functionalized porous substrate having terminal or non-terminal alkyne or alkene groups can be easily transformed into either a superhydrophobic or superhydrophilic surface under UV irradiation based on photoinduced click-reactions. In particular, superhydrophobic-superhydrophilic patterns, such as micropatterns, can be formed for example by the reaction of terminal or non-terminal alkyne or alkene groups contained in the substrate, which is for example a porous polymer layer, with thiol compounds represented by the general formulae $R^1$—SH and $R^2$—SH using UV irradiation, as it is schematically shown in FIG. 2 for terminal alkyne groups.

According to the present invention, the surface of the alkyne or alkene functionalized porous substrate may be modified in a first modification step by reacting the terminal or non-terminal alkyne or alkene groups contained in the porous substrate with a first photo-clickable compound $R^1$—SH, $R^1$—S—S—$R_x$, or $R^1$-Tz-$R_x$ using UV irradiation through a photomask, upon which a pattern of superhydrophilic or superhydrophobic areas is created on the surface of the porous substrate. Thereafter, in a second step, the unreacted terminal or non-terminal alkyne or alkene groups in the unmodified areas of the surface of the alkyne or alkene functionalized porous substrate are reacted with a second photo-clickable compound $R^2$—SH, $R^2$—S—S—$R_x$, or $R^2$-Tz-$R_x$ different from the first photo-clickable compound using UV irradiation (hereinafter also referred to as "second modification step"). Based thereon, by the second modification step, a pattern of superhydrophilic and superhydrophobic areas is created on the surface of the porous substrate as the second photo-clickable compound provides a reversed surface modification compared to the first photo-clickable compound.

That means, according to the present invention, the surface of the alkyne or alkene functionalized porous substrate is modified in two sequential steps which allows that an inverse pattern of superhydrophilic and superhydrophobic areas can be obtained simply by switching the order of the photo-clickable compounds. In particular, in the first modification step, it is possible to modify the surface of the alkyne or alkene functionalized porous substrate by reacting the preferable terminal alkyne or alkene groups present on the surface with a first photo-clickable compound having a hydrophilic residue $R^1$ using UV irradiation through a photomask, thereby creating a pattern of superhydrophilic areas. Thereafter, in the second modification step, the unreacted preferable terminal alkyne or alkene groups in the unmodified areas of the surface of the alkyne or alkene functionalized porous substrate, which have been shielded by the photomask during the first modification step, can be reacted with a second photo-clickable compound having a hydrophobic residue $R^2$ using UV irradiation, thereby creating superhydrophobic areas on the areas of the surface of the porous polymer which have not been modified in the first modification step.

As mentioned above, alternatively, in the first modification step, it is possible to modify the surface of the alkyne or alkene functionalized porous substrate by reacting the preferable terminal alkyne or alkene groups present on the surface with a first photo-clickable compound having a hydrophobic residue $R^1$ using UV irradiation through a photomask, thereby creating a pattern of superhydrophobic areas. Thereafter, in the second modification step, the unreacted preferable terminal alkyne or alkene groups in the unmodified areas of the surface of the alkyne or alkene functionalized porous substrate, which have been shielded by the photomask during the first modification step, can be reacted with a second photo-clickable compound having a hydrophilic residue $R^2$ using UV irradiation, thereby creating superhydrophilic areas on the areas of the surface of the porous polymer which have not been modified in the first modification step. The use of photochemical methods allows precisely controlling the geometry, size and distance between the superhydrophilic and superhydrophobic areas by the design of the photomask.

An advantage of using the reactive alkyne or alkene surface for patterning is that the non-irradiated areas remain reactive after the first step of patterning and can be subsequently modified to create patterns of a secondary functionality. Importantly, the second step of modification does not require a photomask as a reactive alkyne or alkene pattern is maintained and generated, respectively, during the first modification step of irradiation through the photomask.

In the above-mentioned formulae of the photo-clickable compounds being disulfides and tetrazoles, i.e. $R^1$—S—S—$R_x$, $R^1$-Tz-$R_x$, $R^2$—S—S—$R_x$, and $R^2$-Tz-$R_x$, the moiety $R_x$ is not specifically limited as long as the desired surface modification can be obtained. Thus, $R_x$ is preferably a moiety similar to $R^1$ and $R^2$, respectively, meaning that $R_x$ is a hydrophilic moiety if $R^1$ or $R^2$ is hydrophilic, or $R_x$ is a hydrophobic moiety if $R^1$ or $R^2$ is hydrophobic. Accordingly, $R_x$ may be the same as or different from the residues $R^1$ and $R^2$.

According to the present invention, the conditions for carrying out the photoinduced click-reactions to modify the surface property are not specifically limited and any conditions known in the art can be applied. For instance, as a general procedure, the surface of the alkyne or alkene functionalized porous substrate is brought into contact with the respective photo-clickable compound and irradiated with a UV radiation suitable to covalently bond the —S—$R^1$ and —S—$R^2$ moiety, respectively, of the thiol compound and the disulfide compound, or the $R^1$—C=N—N—$R_x$ and $R^2$—C=N—N—$R_x$ moiety of the tetrazole compound to the carbon-carbon triple or double bond. Contacting the respective compounds to the surface of the alkyne or alkene functionalized porous substrate may be carried out, for example, by wetting said porous substrate with a solution containing the photo-clickable compounds.

Suitable UV radiation sources are well known in the art, and as a non-limiting example irradiation with UV light of 200 to 400 nm with intensities ranging from 0.5 to 16 mW·cm$^{-2}$ can be mentioned. According to the present invention, the photoinduced click-reactions can be also carried out using sunlight, i.e. it is not necessary that a specific UV radiation source to be employed.

The reaction temperature of the photoinduced click-reactions is not specifically limited. Preferably, the photoinduced click-reactions are carried out at a temperature between 0 and 60° C., more preferably between 15 and 35° C., and most preferred at ambient temperature (room temperature).

According to the present invention, the irradiation time for the surface modification of the alkyne or alkene functionalized porous substrate using the photoinduced click-reactions is preferably from 0.25 s to 30 min, more preferably 15 min, 5 min, 2 min, or 1 min or shorter, and even more preferably 40 s or shorter in each modification step. In particular, in a preferred embodiment, UV irradiation is carried out for 0.25 to 25 s, more preferably 0.5 to 20 s, in each modification step of modifying the surface of the alkyne or alkene functionalized porous polymer layer. An irradiation time of 1 to 15 s is particularly preferred.

According to the present invention, the step of modifying the surface of the alkyne or alkene functionalized porous substrate can be carried out in the presence of a photoinitiator. Various photoinitiators (UV initiators) known in the art can be used. Non-limiting examples of photoinitiators which can be used include benzophenone, dimethoxyacetophenone, xanthone, thioxanthone, camphorquinone their derivatives, and mixtures thereof. A particularly preferred photoinitiator is 2,2-dimethoxy-2-phenylacetophenone (DMPAP). The specific photoinitiator selected and its concentration can be adjusted by a person skilled in the art. Generally, the concentration of the photoinitiator should be from 0.2 to 10 wt. % based on the total weight of the solution containing the photo-clickable compounds.

Preferably, the step of modifying the surface of the alkyne or alkene functionalized porous substrate can be also achieved without the use of a photoinitiator. In such a case, the irradiation time is preferably from 5 to 20 s or more, such as 30 s, 60 s, 120 s or 300 s.

According to the present invention, the thiol compounds used to modify the surface of the alkyne or alkene functionalized porous substrate are represented by the general formulae $R^1$—SH and $R^2$—SH, respectively, wherein $R^1$ and $R^2$ represent either hydrophilic or hydrophobic residues. Similar considerations apply for the disulfide and tetrazole compounds. The hydrophilic and hydrophobic residues $R^1$ and $R^2$ are not specifically limited as long as these compounds are capable to provide either a superhydrophilic and superhydrophobic surface, respectively. For instance, the hydrophilic residues represented by $R^1$ and $R^2$ are at least one member represented by the general formula Q-X, wherein Q represents a substituted or unsubstituted $C_1$-$C_6$ alkyl group and X represents a functional group including a hydroxy group, a carbonyl group, an aldehyde group, a carboxyl group, an amine group, an imine group, an imide group, or an amide group, or a sugar moiety and respective salts thereof. Substituents of the $C_1$-$C_6$ alkyl group are not specifically limited as long as the hydrophilic character of the residue is not changed including, for example, halogen atoms such as fluorine, chlorine and iodine.

Preferably, the hydrophilic residues represented by R1 and R2 are at least one member represented by the general formula Q-X, wherein X represents a (poly)hydroxy group, a (poly)amine group, a (poly)amide group or a (poly)carboxyl group or a sugar moiety. Q includes preferably at least one member selected from the group consisting of a $C_1$-$C_6$ alkyl group, preferably $C_1$-$C_4$ alkyl group, which may contain one or more hetero atoms selected from O, N, P and S. Particularly preferred thiol compounds having a hydrophilic residue are cysteamine, 3-mercaptopropionic acid and 2-mercaptoethanol.

Further, according to a preferred embodiment of the present invention, the hydrophobic residues represented by $R^1$ and $R^2$ are at least one member including a substituted or unsubstituted, polyfluorinated or non-fluorinated, linear, branched or cyclic $C_6$-$C_{30}$ alkyl group, substituted or unsubstituted, polyfluorinated or non-fluorinated, linear, branched or cyclic $C_6$-$C_{30}$ alkenyl group, substituted or unsubstituted, polyfluorinated or non-fluorinated $C_6$-$C_{30}$ aryl group. Preferably, the hydrophobic residues represented by $R_1$ and $R_2$ are selected from a substituted or unsubstituted, such as polyfluorinated or non-fluorinated, $C_8$-$C_{16}$ alkyl group which may contain one or more hetero atoms as mentioned above. The aforementioned substituents are not specifically limited as long as the hydrophobic character of the residue is not changed. As non-limiting examples, said substituents are selected from the group consisting of halogen atoms such as fluorine, chlorine and iodine. Particularly preferred thiol compounds having a hydrophobic residue are polyfluorinated $C_8$-$C_{16}$ alkyls. More preferred thiol compounds are 1H,1H,2H,2H-perfluorodecanethiol and polyfluorinated 1-dodecanethiol. More preferred disulfides are dibutyl disulfide and polyfluorinated didodecyl disulfide. More preferred tetrazoles are 4-(2-phenyl-2H-tetrazol-5-yl)benzoic acid and ethyl 4-(2-phenyl-2H-tetrazol-5-yl)benzoate.

The surface modification of the alkyne or alkene functionalized porous substrate using the photoinduced click-reactions can be performed in various solvents including water allowing to pattern biomolecules. The ability to perform the surface functionalization in different, both nonpolar and polar solvents including water increases the number of possible reagents applicable for the functionalization.

According to a preferred embodiment, the solvent used for the photoinduced click-reactions comprises water. Water is especially interesting in terms of its environmental impact, low cost and the compatibility with thiol-containing biomolecules, such as proteins or peptides. A particularly preferred embodiment of the present invention is to use water or a mixture of water and a polar solvent, preferably protic polar solvent, as solvent for the modification step upon which the surface of the alkyne or alkene functionalized porous substrate is modified into a superhydrophilic surface.

On the other hand, for the modification step upon which the surface of the alkyne or alkene functionalized porous substrate is modified into a superhydrophobic surface, a nonpolar and/or a polar solvent including water is preferably used in which the respective photo-clickable compound can be dissolved. As non-limiting examples, besides water, alcohols such as alcohols containing one to six carbon atoms, ethers, alkanes, or ketons, and particularly methanol, ethanol, aceton, ethyl acetate, pentane, dichloromethane (DCM), dimethylformamide (DMF), dimethyl sulfoxide (DMSO), acetonitrile or mixtures thereof, may be mentioned.

As mentioned above, an advantage of the method according to the present invention is that the non-irradiated areas remain reactive after the first modification step and can be subsequently modified to create patterns of a secondary functionality, according to which the second modification step does not necessarily require a photomask. According to the present invention, even when in the second modification step no photomask is used, the WCAs of the superhydrophobic or superhydrophilic areas created in the first modification step are not significantly changed after the second modification step.

According to a preferred embodiment, for example in the case that superhydrophobic areas are created on the surface in the first modification step, in the second modification step, the photo-clickable compound having a hydrophilic residue $R^2$ is dissolved in a solvent which has a contact angle ($\theta_{st}$) to the unmodified areas of the residual alkyne or alkene groups of 30° or less, preferably, 20° or less, and more preferably less than 10° and even more preferably of close to 0°, while having a high contact angle ($\theta_{st}$) of at least 90°, preferably at least 110°, more preferably at least 120°, and most preferably at least 130°, to the modified areas.

According to the present invention, the substrate may be a porous polymer layer which is not specifically limited as long as the polymer layer is porous or rough, respectively, preferably micro to nanoporous (with both pore and globule diameters being in the range from 20 to 2000 nm), and contains terminal or non-terminal alkyne or alkene groups after the functionalization step while excluding polymer brushes. The alkyne or alkene functionalized porous polymer layer may be prepared from any porous cross-linked polymer structure having functional groups allowing the introduction of terminal or non-terminal alkyne or alkene groups. In particular, as suitable non-limiting functional groups, hydroxy moieties present in the porous polymeric structure may be mentioned which can be reacted, for example, in terms of an esterification, etherification, or thioetherification, silylation, alkylation, amidation or acylation reaction so as to incorporate terminal or non-terminal alkyne or alkene groups into the porous polymeric structure. These reactions can be similarly used for any other material constituting the porous substrate.

In such a case, for example, it is possible to use any acid or a suitable derivative thereof having a terminal or non-terminal alkyne or alkene group as reacting agent. For example, the esterification may be carried out between the hydroxy groups of the porous polymeric structure and a suitable reacting agent, such as acids, acid chlorides, or acid anhydrides. The reaction conditions for these reactions are well known to a person skilled in the art and can be adjusted to the respective components used. Preferred reacting agents to be used to incorporate the terminal or non-terminal alkyne or alkene group into the porous polymeric structure are selected from the group consisting of acids having a terminal or non-terminal alkyne or alkene group such as propiolic acid, 3-butynoic acid, 4-pentynoic acid, 5-hexynoic acid, 6-heptynoic acid, 7-octynoic acid, 8-nonynoic acid, 9-decynoic acid, 10-undecynoic acid, 3-butenoic acid, 4-pentenoic acid, 5-hexenoic acid, and respective derivatives thereof.

Also, reacting agents to be used to incorporate the terminal or non-terminal alkyne or alkene group into the porous substrate are preferably selected from the group consisting of silanes having a terminal or non-terminal alkyne or alkene group such chloro(dimethyl)vinylsilane, dichloromethylvinylsilane or trichlorovinylsilane.

Depending on the selected reacting agents, a person skilled in the art is able to select suitable reaction conditions, such as reaction temperature and time, catalysts and optionally coupling reagents, for the respective coupling reactions. In this context, it should be noted that within the scope of the present invention, the modification of incorporating terminal or non-terminal alkyne or alkene groups into the porous substrate, such as the polymeric structure, should proceed completely throughout the thickness of the specific porous material.

Further, as mentioned above, the porous polymeric structure having functional groups allowing the introduction of terminal or non-terminal alkyne or alkene groups is not specifically limited, and may be any natural polymeric material structure having functional groups allowing the introduction of terminal or non-terminal alkyne or alkene groups (e.g. hydroxyl groups), such as polysaccharide based materials including, for example cellulose, hemicellulose and starch, or obtained by polymerization.

For example, the porous polymeric structure having functional groups allowing the introduction of terminal or non-terminal alkyne or alkene groups exhibiting either hydrophobic or hydrophilic properties can be comprised of a crosslinked polyvinyl monomer, wherein the polyvinyl monomer is one or more monomers selected from the group consisting of alkylene diacrylates, oligoethyleneoxide diacrylates or dimethacrylates, alkylene dimethacrylates, pentaerythritol tetraacrylate, pentaerythritol tetramethacrylate, trimethylolpropane triacrylate, trimethylolpropane trimethacrylate, pentaerythritol diacrylate, pentaerythritol triacrylate, pentaerythritol dimethacrylate, pentaerythritol trimethacrylate, alkylene diacrylamides, alkylene dimethacrylamides, hydroxyalkylene diacrylates, hydroxyalkylene dimethacrylates, wherein the alkylene group consists of 1 to 4 carbon atoms, oligoethylene glycol diacrylates, vinyl esters of polycarboxylic acids, substituted divinylbenzene, and substituted divinylnaphthalene. In a particularly preferred embodiment, the polyvinyl monomer is selected from the group consisting of ethylene dimethacrylate and methylene-bis-acrylamide.

Such a hydrophobic or hydrophilic porous polymeric structure may further comprise a monovinyl monomer, wherein the monovinyl monomer is selected from the group consisting of alkyl acrylates, alkyl methacrylates, aryl acrylates, aryl methacrylates, aryl alkyl acrylates, aryl alkyl methacrylates, fluorinated alkyl acrylates, fluorinated alkyl methacrylates, styrene, vinylnaphthalene, vinylanthracene, and derivatives thereof, wherein the alkyl group in each of the alkyl monomers has 1-18 carbon atoms, vinylacetate, vinylpyrrolidone, acrylic acid, methacrylic acid, methacrylamide, acrylamide, alkyl derivatives of methacrylamide, alkyl derivatives of acrylamide, wherein the alkylene group consists of 1-4 carbon atoms, hydroxyalkyl acrylates and acrylamides, hydroxyalkyl methacrylates and methacrylamides, oligoethylene glycol acrylates and oligoethylene glycol methacrylates, potassium 3-sulfopropyl acrylate, potassium 3-sulfopropyl methacrylate, 2-acryloamido-2-methyl-1-propane-sulfonic acid, 2-acrylamidoglycolic acid, [2-(methacryloyloxy)ethyl]trimethylammonium chloride, and N-[3-(dimethylamino)propyl]methacrylamide.

In a preferred embodiment, the monovinyl monomer is selected from the group consisting of methyl methacrylate, butyl methacrylate, benzyl methacrylate, styrene, 2-hydroxyethyl methacrylate, decaethylene glycol methacrylate, N-isopropylacrylamide, and acrylamide. The above polyvinyl monomer is copolymerized with the monovinyl monomer affording the porous polymeric structure.

In a particularly preferred embodiment of the present invention, the porous polymeric structure comprises at least one member selected from the group consisting of porous poly(2-hydroxyethyl methacrylate-co-ethylene dimethacrylate) (HEMA-EDMA) and porous (trimethylolpropane triacrylate-co-ethylene dimethacrylate) (TMPTA-EDMA).

The porous polymeric structure having functional groups allowing the introduction of terminal or non-terminal alkyne or alkene groups may be provided on a suitable substrate supporting the polymeric material such as a glass plate.

According to the present invention, the thickness of the alkyne or alkene functionalized porous substrate is not specifically limited and may be adjusted depending on the intended use. However, in terms of transparency properties or reducing manufacturing costs, a thin porous substrate is preferred. In particular, the thickness of the alkyne or alkene functionalized porous substrate is preferably from 1 µm to 100 µm, more preferably from 5 µm to 50 µm and most preferably from 10 to 15 µm. According to said embodiment, it is preferred that the alkyne or alkene functionalized porous substrate is supported on a suitable support, such as a glass plate.

The support, however, is not limited to a glass substrate and, generally, any solid support may be used which is solid, preferably at a temperature within the range of −30° C. to 130° C., more preferably within the range of 0° C. to 40° C., and most preferably at room temperature. According to the present invention, the solid support can be selected from the group consisting of glass, metal, such as a stainless steel plate, or an aluminum foil, plastic, concrete, wood, and masonry. In a preferred embodiment of the present invention, the solid support is transparent, and in a particularly preferred embodiment of the present invention, the solid support is a glass solid support. Such a glass solid support may be activated and/or modified prior to use.

The thickness of the alkyne or alkene functionalized porous substrate may also be increased compared to the aforementioned values so that the porous polymer layer may be self-supporting. In such a case, the thickness of the alkyne or alkene functionalized porous substrate is preferably from 10 µm to 1.5 mm, more preferably from 125 µm to 1 mm.

Further, as mentioned above, the alkyne or alkene functionalized porous substrate has preferably a nanoporous structure. Within the scope of the present invention, the term "nanoporous" refers to pores having an average pore size of 1500 nm or less as measured by scanning electron microscope (SEM), including microporous materials having an average pore size of from 0.2 to 2 nm, mesoporous materials having an average pore size of from 2 to 50 nm and macroporous materials having an average pore size of from 50 to 1000 nm. Preferably, the average pore size of the alkyne or alkene functionalized porous substrate falls within the range of mesoporous and macroporous materials, whereof an average pore size of from 30 nm to 500 nm is even more preferred.

For example, the porosity of the alkyne or alkene functionalized porous polymer layer obtained from the ratio of porogens to monomers in the polymerization mixture is preferably from 10% to 80%, more preferably from 25% to 70%, most preferably from 40% to 60%.

Figure 3:
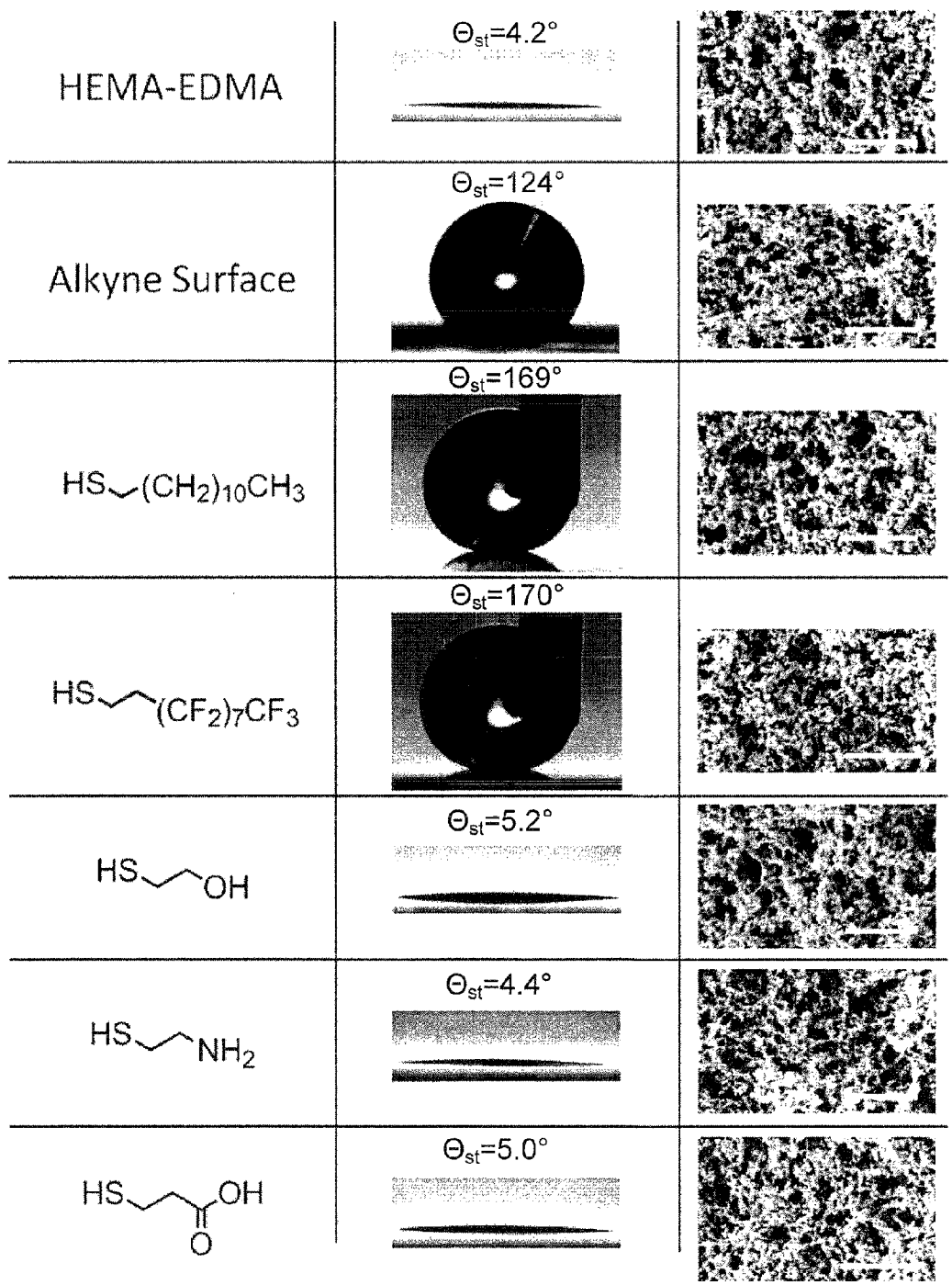
FIG. 3: Water droplets on various polymer layers and the corresponding SEM images: HEMA-EDMA, alkyne-functionalized HEMA-EDMA, as well as alkyne surfaces modified with 1-dodecanethiol, 1H,1H,2H,2H-perfluorodecanethiol, 2-mercaptoethanol, cysteamine, and 3-mercaptopropionic acid. The static WCAs are 4.2°, 124°, 169°, 170°, 5.2°, 4.4°, and 5.0° respectively. Scale bars are 1 μm.

Importantly, as mentioned above, according to the present invention, the surface modification by which alkyne or alkene groups are incorporated into the porous substrate, such as the polymeric material (layer), throughout the whole material, does not significantly change the morphology of the porous substrate, as it is demonstrated in the SEM pictures shown in FIG. 3. The porous structure of e.g. the alkyne or alkene functionalized porous polymer layer plays an important role in fabricating superhydrophobic or superhydrophilic surfaces.

Furthermore, as mentioned above, the substrate may also be made of a material the surface of which can be activated by $O_2$ plasma. In particular, the alkyne or alkene functionalized porous substrate is preferably a glass substrate the surface of which has been activated with $O_2$ plasma and functionalized with one of the aforementioned silane compounds, wherein silica nanofilaments are formed on the surface.

Furthermore, the present invention relates to a modified surface obtainable by the method according to the present invention. According to a preferred embodiment, the modified surface according to the present invention comprises a pattern of superhydrophilic and superhydrophobic areas. Preferably, the pattern of superhydrophilic and superhydrophobic areas is a micropattern. Within the scope of the present invention, the term "micropattern" is understood as any pattern with features above 5 micrometers and below 5000 micrometers. The method for the fabrication of superhydrophobic-superhydrophilic patterns is not limited to the micropatterns and can be also applied to larger patterns.

The patterned modified surface coating according to the present invention preferably comprises an alkyne or alkene functionalized porous polymer layer having terminal or non-terminal alkyne or alkene groups, wherein the surface of the porous polymer layer comprises a pattern of superhydrophilic and superhydrophobic areas.

As mentioned above, the patterned modified surface according to the present invention comprises an alkyne or alkene functionalized porous polymer layer having terminal or non-terminal alkyne or alkene groups which has preferably a nanoporous structure.

Figure 4:
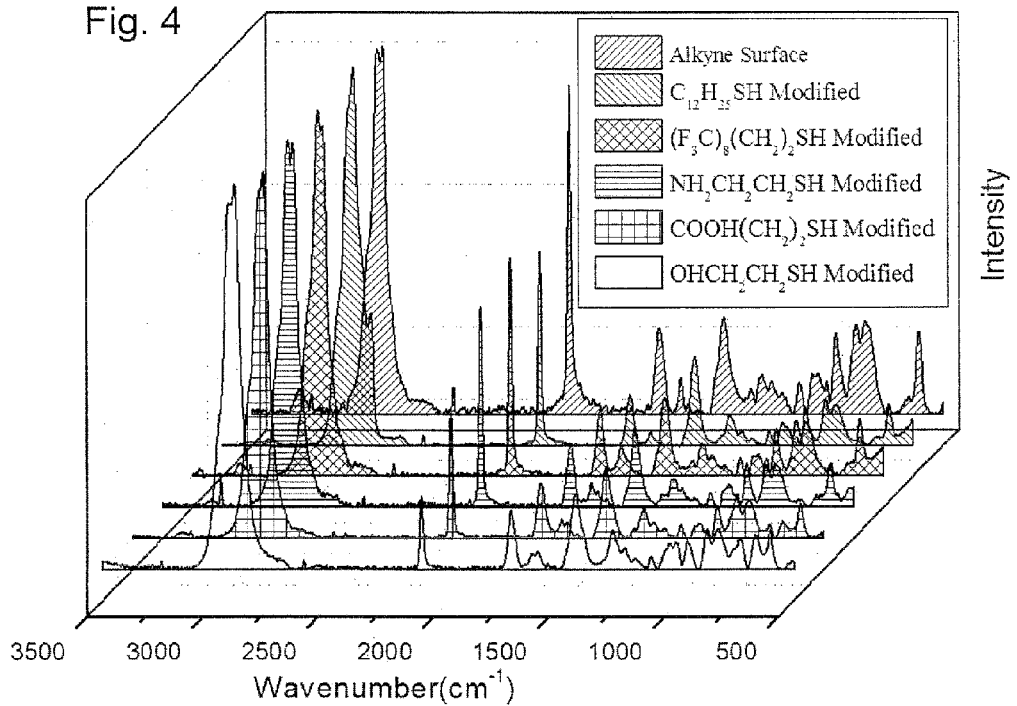
FIG. 4: The Raman spectra of a non-modified alkyne surface, as well as alkyne surfaces modified with 1-dodecanethiol, 1H, 1H,2H,2H-perfluorodecanethiol, cysteamine, 3-mercaptopropionic acid, and 2-mercaptoethanol. The decline of the band ratios of ~2940 cm$^{-1}$ (C—H alkyl free vibrations) to ~2120 cm$^{-1}$ (C≡C triple bond stretch) illustrates that the alkyne groups react with several kinds of thiols. Some alkyne groups are buried inside the polymer and not accessible, thus the alkyne signal (~2120 cm$^{-1}$) does not disappear even after long UV irradiation.

FIG. 4 shows Raman spectra of a non-modified alkyne functionalized porous polymer layer, as well as several alkyne functionalized porous polymer layers modified with different thiol compounds in accordance with the present invention. The decline of the band ratios of approximately 2940 $cm^{-1}$ (C—H alkyl free vibrations) to 2120 $cm^{-1}$ (carbon-carbon triple bond stretch) illustrates that the alkyne groups react with the thiol compounds. However, since the modification of the alkyne functionalized porous polymer layer is carried out on the surface, alkyne groups inside the porous polymer layer which are not accessible for the thiol-yne reaction remain unreacted, as it is demonstrated by the alkyne signal at approximately 2120 $cm^{-1}$, which does not disappear even after long UV irradiation.

Figure 5:
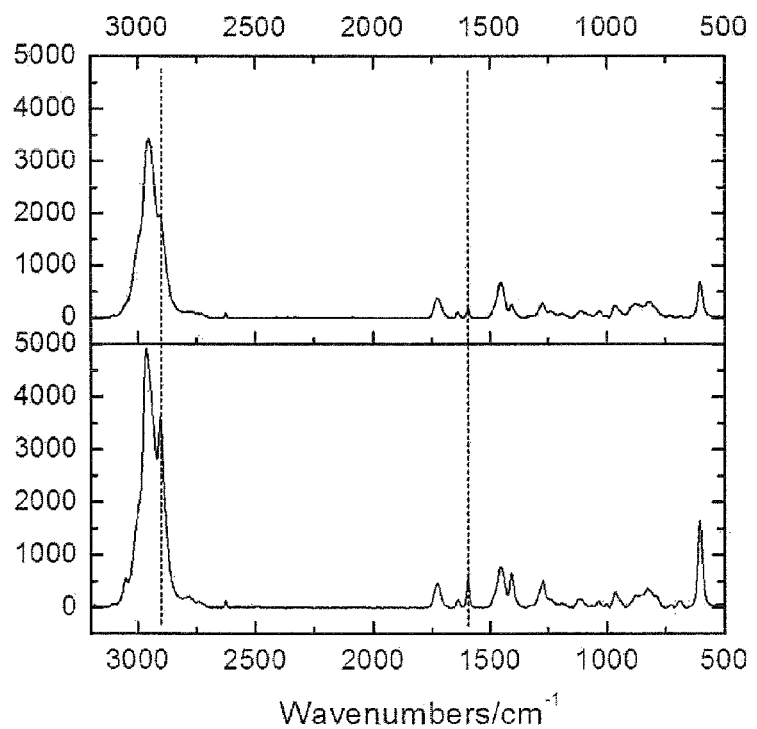
FIG. 5: The Raman spectra of an alkene functionalized porous polymer layer (bottom), as well as alkene functionalized porous polymer layers modified with cysteamine hydrochloride in accordance with the present invention (top). The decline of the band 1600 cm$^{-1}$ (C═C double bond stretch) illustrates that the alkene groups react with the thiol compounds. However, since the modification of the alkene functionalized porous polymer layer is carried out on the surface, alkene groups inside the porous polymer layer which are not accessible for the thiol-ene reaction remain unreacted, as it is demonstrated by the alkene signal at approximately 1600 cm$^{-1}$, which does not disappear even after long UV irradiation.

FIG. 5 shows Raman spectra of an alkene functionalized porous polymer layer (bottom), as well as alkene functionalized porous polymer layers modified with cysteamine hydrochloride (top) in accordance with the present invention. The decline of the band at 1600 cm−1 (carbon-carbon double bond stretch) illustrates that the alkene groups react with the thiol compounds. However, since the modification of the alkene functionalized porous polymer layer is carried out on the surface, alkene groups inside the porous polymer layer which are not accessible for the thiol-ene reaction remain unreacted, as it is demonstrated by the alkene signal at approximately 1600 cm−1, which does not disappear even after long UV irradiation.

According to the present invention, the patterned modified surface preferably comprises a pattern of superhydrophilic and superhydrophobic areas, which may be also referred to as spots, channels and barriers, respectively, depending on the pattern formed. In particular, in a preferred embodiment of the present invention, the superhydrophilic areas are separated by the superhydrophobic areas so as to form an array.

Figure 6:
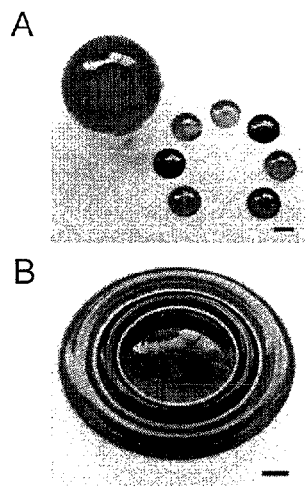
FIG. 6: Optical images of (A) superhydrophilic-superhydrophobic patterns filled with dye water solutions; (B) superhydrophobic gap between the two rings is 100 μm.
Figure 7:
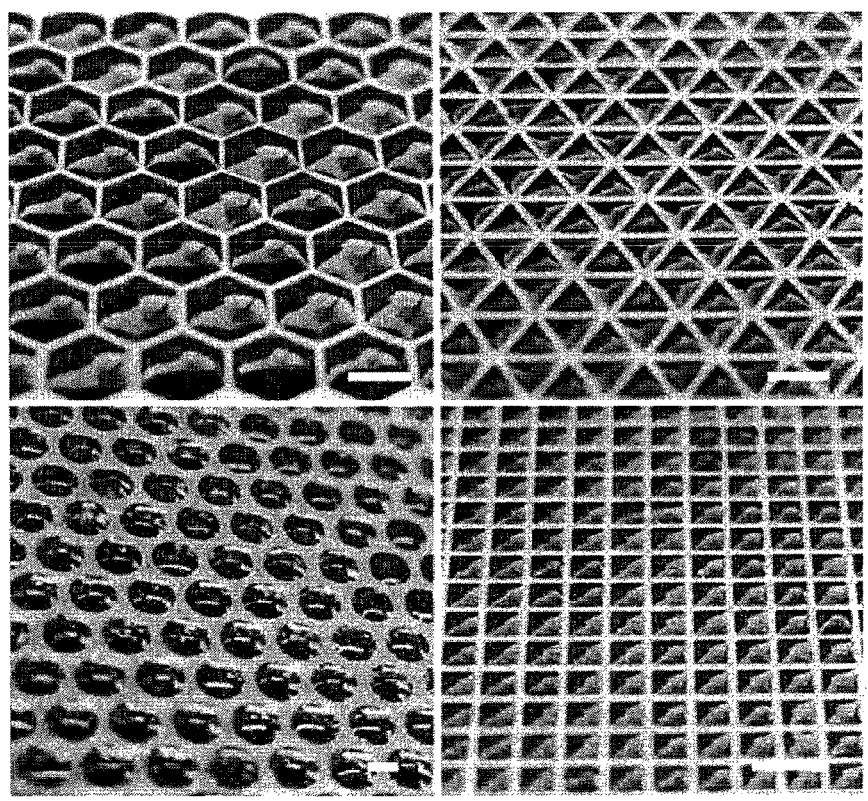
FIG. 7: DropletMicroarrays formed by dipping the superhydrophobic-superhydrophilic arrays with different geometries into water. The wetted parts become transparent (dark). Scale bars are 1 mm.

In another preferred embodiment, the superhydrophilic areas are separated by the superhydrophobic areas so as to form superhydrophilic channels, which can be used for microfluidic applications. In particular, as it is shown in FIG. 6, several sizes and geometries of superhydrophobic and superhydrophilic areas can be created. Further, droplet microarrays can be formed by dipping the superhydrophobic-superhydrophilic micropattern with different geometries into water, as shown in FIG. 7. Due to the reduced light scattering, the superhydrophilic porous polymer layer becomes transparent when wetted with water, allowing easier discrimination of spots and facilitating the use of inverted microscopes (see FIG. 8).

Further, according to the present invention the superhydrophilic areas may be separated by the superhydrophobic areas in terms of barriers, so that the superhydrophilic areas have preferably a specific shape allowing dense packing, such as a square, rectangular, triangular, or hexagonal shape, as it is shown in FIG. 7. Particularly preferred is a square shape which allows dense packing of the areas and ease the readout. However, the micropatterns are not limited to any array-format, but represent a more general and novel approach that allows patterning and for example culturing of cells in a predesigned spatial order and/or spatial pattern. The term "spatial pattern" as used herein is not particularly limited and can encompass any desired pattern.

In one embodiment of the present invention, the area-density of the superhydrophilic areas is at least 1 per $cm^2$ and up to 500 per $cm^2$ of the micropattern, more preferably at least 100 per $cm^2$ of the micropattern, even more preferably at least 200 per $cm^2$ of the micropattern. In a particularly preferred embodiment of the present invention, the amount of superhydrophilic areas is at least 300 per $cm^2$ of the micropattern.

For example, if the superhydrophilic-superhydrophobic micropattern according to the present invention is used in biological and/or diagnostic screening applications, preferably, the micropattern of the present invention has a size which fits on a standard microtiter scaled plate (12×8 cm), preferably a size of about 11×7 cm with at least 40000, preferably at least 50000 superhydrophilic areas separated by superhydrophobic barriers.

Preferably, the overall area-number on a single chip is significantly increased. When used as a cell microarray, minimal area of a single area in the micropattern is limited by the amount of cells needed in each area to obtain statistically valid data.[17] In a particularly preferred embodiment of the present invention, the area of each of the superhydrophilic areas is 0.5 mm$^2$ or less, more preferably 0.2 mm$^2$ or less, and most preferably 0.15 mm$^2$ or less. In case that the superhydrophilic areas have a square shape, each of the superhydrophilic areas has preferably a side length of 700 μm or less, more preferably 450 μm or less, and most preferably 335 μm or less. In another preferred embodiment of the present invention, the size of the superhydrophilic areas is large enough to accommodate at least 100 cells, preferably 200 cells, more preferably at least 300 cells.

Figure 9:
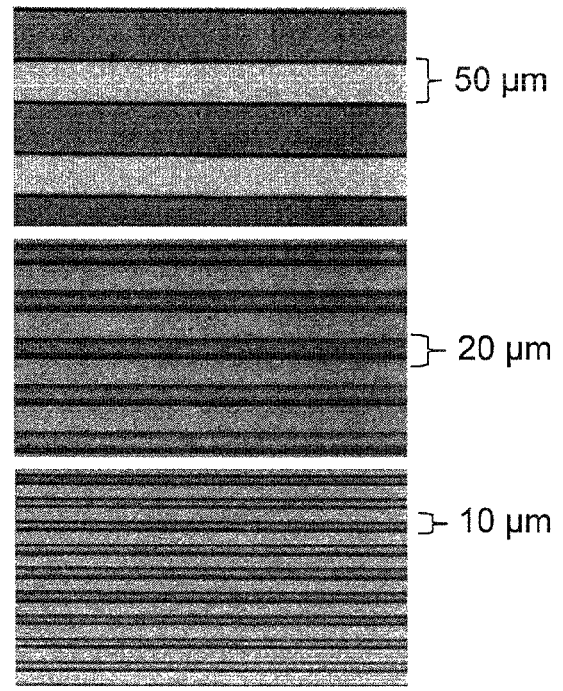
FIG. 9: Superhydrophilic regions (light areas) separated by superhydrophobic gaps (dark areas) of different widths.

In a preferred embodiment of the present invention, the superhydrophobic barriers have a width of 500 μm or less, preferably 200 μm or less, more preferably 100 μm or less and even more preferably 50 μm or less. According to the present invention, multicomponent patterns with feature sizes as small as 10 μm can be produced (see FIG. 9). A significant advantage of the micropattern according to the present invention is that the superhydrophobic barriers completely prevent cross-contamination between the areas, despite the reduced width of the barriers.

Further, as mentioned above, the thickness of the alkyne or alkene functionalized porous substrate is preferably from 1 μm to 100 μm, more preferably from 5 μm to 50 μm and most preferably from 10 to 15 μm. According to said embodiment, it is preferred that the alkyne or alkene functionalized porous substrate is supported on a suitable support, such as a glass plate.

According to the present invention, the superhydrophobic and superhydrophilic surfaces according to the present invention are stable under several conditions. In particular, the superhydrophobic areas of the surface are stable in air as well as in different aqueous solutions, such as for example neutral as well as both in acetic (pH≤6) and basic (pH≥8) environments. That means, according to the present invention, the superhydrophobicity of the surfaces can be maintained for prolonged incubation times, such as 10 hours (h) or more, preferably 50 h or more, and more preferably 100 h or more.

According to a preferred embodiment, the modified patterned surface has a flat surface, and preferably has no physical barriers between the areas. Accordingly, the patterned surface according to the present invention can be used to form an array of separated homogenous fluid microdroplets or hydrogel micropads of a desired shape and size in a desired spatial pattern, allowing the application of an aqueous fluid to a multitude of the superhydrophilic areas at the same time. The term "aqueous fluid" as used herein is not particularly limited and relates to any aqueous fluids that might be of interest for the formation of a respective microdroplet array. In particular, the aqueous fluid can be selected from the group consisting of water, aqueous solutions and aqueous media. In a specific embodiment, the aqueous fluid is an aqueous solution that can form a hydrogel upon crosslinking, e.g. a solution containing one or more compounds which polymerize upon contact with a suitable crosslinker, or upon UV-initiated polymerization. In this specific embodiment, the aqueous fluid microdroplets form hydrogel micropads upon crosslinking.

In another embodiment, the aqueous fluid can contain biological specimens. These biological specimens can be selected from the group consisting of cells, bacteria, viruses and multicellular organisms. Preferably, said biological specimens do not adhere and/or grow on surfaces. The term "cell" as used in this context is not particularly limited and encompasses any kind of prokaryotic and eukaryotic cells that might be of interest. The term "multicellular organism" as used in this context is not particularly limited and encompasses any multicellular organisms in any developmental stage that might be of interest, provided that the multicellular organism is not too big to fit into the microdroplets formed. Multicellular organisms that are of particular interest in the context of the present invention are *Danio rerio*, i.e. zebrafish, e.g. zebrafish eggs or zebrafish embryos, and the nematode *Caenorhabditis elegans*.

The term "microdroplet" as used herein refers to the droplets formed on the micropattern of the present invention. Patterns confining the microdroplets can have any desired shape, e.g. a circular or hexagonal shape, and can have also sharp-edged geometries such as triangular shapes. The microdroplets can have volumes of 100 μl to 30 μl. The number of microdroplets formed on the micropatterns of the present invention is not particularly limited and depends on the size of the micropattern and the number of superhydrophilic areas formed thereon. As an example, arrays, in particular high-density arrays, of thousands of microdroplets can be formed. The microdroplets are preferably homogenous, i.e. they all have the same size and shape, and they are separated, i.e. they are separated from each other by the superhydrophobic areas separating the superhydrophilic areas on which the microdroplets form. In this manner, the individual microdroplets are completely isolated. An array of microdroplets as formed can be also referred to as "DropletArray".

As mentioned above, the term "spatial pattern" as used herein is not particularly limited and can encompass any desired pattern of e.g. microdroplets. Preferably, the pattern is chosen such that the density of microdroplets per area is maximized.

As mentioned above, the micropattern may have a flat surface, and more preferably no physical barriers between the areas, thus permitting parallel cell seeding which is very important for achieving high data-quality.[18] The absence of physical barriers also eliminates optical problems that occur with further miniaturization of microwell plates. The high density of the microspots can accelerate and simplify data acquisition. According to the present invention, another important advantage is that much smaller amounts of probe-molecules are required for single transfection experiments, thus making the method significantly less expensive than the liquid-phase analogue. Cost is an important factor in many screens as large biomolecule-libraries like iRNA-libraries are very expensive.

On the other hand, the very good wetting property of the superhydrophilic areas guarantees an easy and homogeneous spreading of the solutions inside the areas independently of their geometry. In a preferred embodiment of the present invention, each single superhydrophilic area is filled with a water solution of biomolecules that are required for different cell experiments, preferably selected from the group, consisting of RNAi screening components, DNAs, proteins, drugs or drug candidates, peptides, recombinant proteins and other small- and macromolecule libraries.

Figure 10:
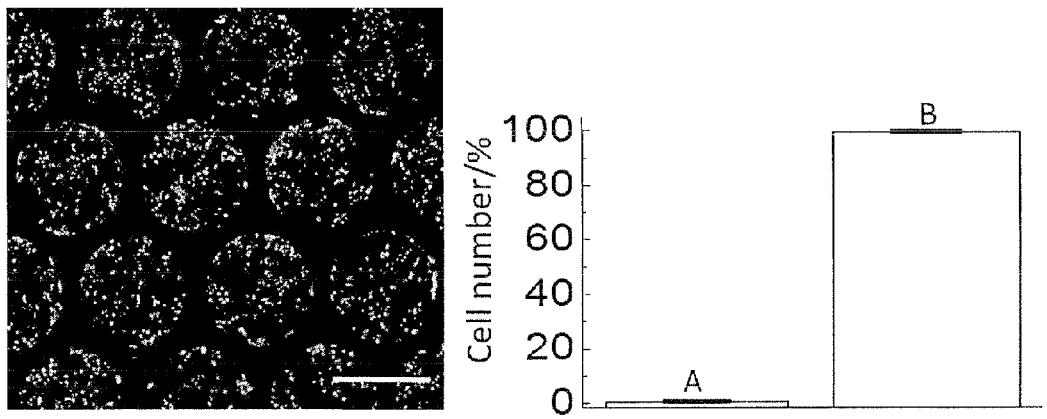
FIG. 10: Fluorescence microscope images of Hela-GFP cells after growing for 48 h on a superhydrophobic-superhydrophilic array, showing the preferential adherence of cells on superhydrophilic spots (right bar in the chart) and less than 1% occupation on the superhydrophobic barriers (left bar in the chart). Scale bar is 1 mm.
Figure 11:
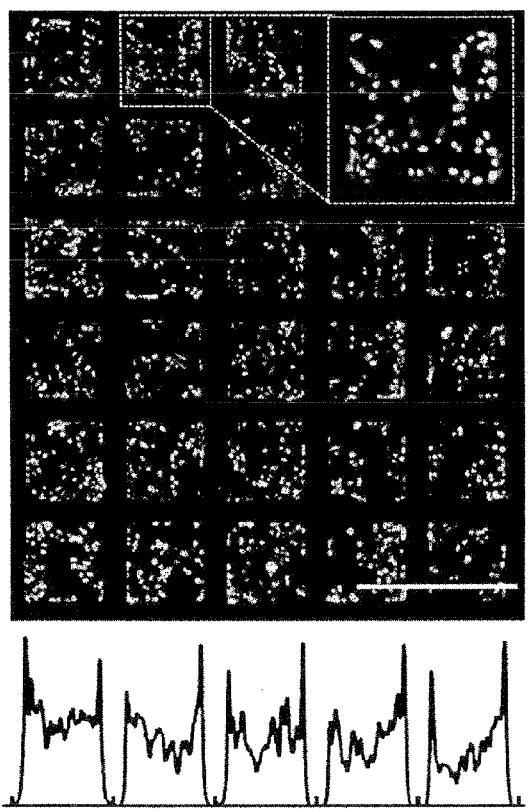
FIG. 11: Fluorescence microscope images of Hela-GFP cells after growing for 48 h on a superhydrophobic-superhydrophilic patterned array. Less than 1% of the total number of cells occupied the superhydrophobic barriers. The graph shows the intensity profile of the green fluorescence vs. distance. Scale bar is 1 mm.
Figure 12:
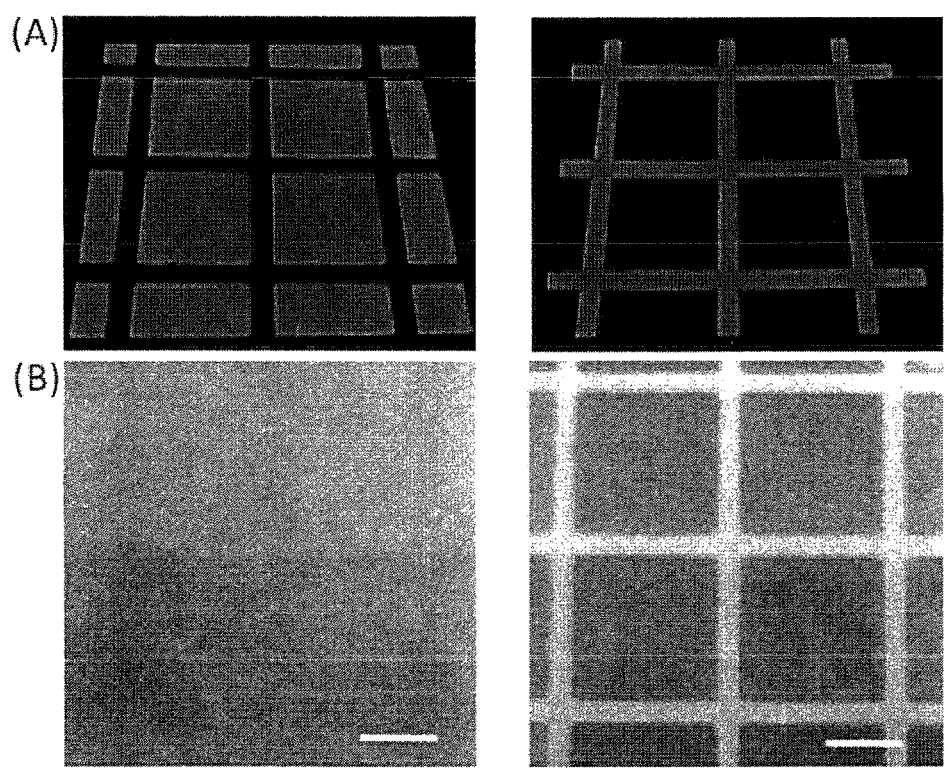
FIG. 12: (A) Laser confocal fluorescence microscope images showing the inverse superhydrophobic-superhydrophilic patterns filled with a water solution of Rhodamine B dye. The sides of the squares are 300 μm. (B) A hexadecane solution of hydrophobic Oil Red O dye wetting both superhydrophilic and superhydrophobic areas (left); the same surface covered with the hexadecane solution of Oil Red O dye after wetting the superhydrophilic barriers with water.

In addition, the superhydrophobic barriers prevent cells from migrating between the adjacent areas. Thus, the serious problem of cell-migration between the areas known for cell arrays of the prior art can be solved using the micropattern according to the present invention. In particular, the superhydrophobic areas (barrier) of the micropatterns according to the present invention show excellent cell repellent properties superior to those produced by the previously described photografting technique disclosed in EP 2 481 794 A1. In particular, according to the present invention, it is preferred that 2% or less, more preferably 1% of cells occupies the superhydrophobic areas separating the superhydrophilic areas after, for example, 2 days of cell culture. This is demonstrated by the following example. Here, Hela-GFP cells were seeded on an array of superhydrophilic spots and superhydrophobic barriers and incubated for 2 days. FIGS. 10 to 11 show that cells adhere well to the superhydrophilic microspots, demonstrating the biocompatibility and nontoxicity of the surface. However, less than 1% of cells occupies the superhydrophobic regions separating the microspot areas after 2 days of culture.

Furthermore, due to the method according to the present invention employing photoinduced click-reactions for the surface modification, the resolution of the micropatterns obtained can be surprisingly increased when compared to conventional techniques known in the art, particularly compared to the patterns produced by the previously described photografting technique disclosed in EP 2 481 794 A1.

As indicated above, the modified surface according to the present invention can be used in several technical fields. In particular, the modified surface according to the present invention can be used as a droplet microarray for chemical synthesis as well as chemical and biological screening applications. The droplets can contain any substance dissolved or suspended in water, and drying the droplets results in the homogeneous deposition of the substance within the porous structure of the superhydrophilic spots. This deposition method can be also used to pre-print an entire array with a crosslinker to form a hydrogel, composed of a crosslinkable polymer, encapsulating for example a cell suspension. Thus, non-adherent cells or other biological species can easily be immobilized in a high density array and used for biological screenings. In combination with automated printing techniques, this method will enable high-throughput screening of many classes of biologically active compounds with respect to their influence on a broad variety of living specimens.

Moreover, as mentioned above, due to the possibility to precisely control the spot geometry, size and density, microchannels can be formed, which can be used for separation of, for example, peptides and in diagnostic applications. Also, the modified surface of the present invention can be used for offset printing. Moreover, the modified surfaces can be used for MALDI-MS applications, cell or bacteria patterning, chemical screenings, and investigation of cell-cell interactions as well as for tissue engineering applications.

The modified surface obtained by the method according to the present invention can be further used for cultivating cells either on the surface in the same medium or in separated microdroplets (the DropletMicroarray format). Such a method for cultivating cells comprises the steps of:
(I) providing the patterned modified surface according to the present invention;
(II) seeding cells to be cultivated into at least one superhydrophilic area of the patterned modified surface; and
(III) cultivating the seeded cells.

Within the scope of the invention, the term "cells" means a generic term and encompass the cultivation of individual cells, tissues, organs, eukaryotic cells including fungal cells such as yeasts and molds, plant cells, protists, animal cells including insect cells, avian cells, mammalian cells, and prokaryotic cells including bacterial cells and archaeal cells. The term cells also includes primary cells, continuous cell lines, stem cells and/or genetically engineered cells, such as recombinant cells expressing a heterologous polypeptide or protein. Recombinant cells include, for example, cells expressing heterologous polypeptides or proteins, such as a growth factor or a blood factor.

Mammalian cells suitable for cultivation in the method of the present invention include those of human origin, which may be primary cells derived from a tissue sample, diploid cell strains, transformed cells or established cell lines. Mammalian cells can include human and non-human cells alike. Mammalian cells of non-human origin can be monkey kidney cells, bovine kidney cells, dog kidney cells, pig kidney cells, rabbit kidney cells, mouse kidney cells, rat kidney cells, sheep kidney cells, hamster kidney cells, Chinese hamster ovarian cells or an animal cell derived from any tissue. In particular, mammalian cells that can be cultivated in the method according to the present invention can be BSC-1 cells, LLC-MK cells, CV-1 cells, COS-cells, COS-1 cells, COS-3 cells, COS-7 cells, VERO cells, MDBK cells, MDCK cells, CRFK cells, RAF cells, RK-cells, TCMK-1 cells, LLC-PK cells, PK15 cells, LLC-RK cells, MDOK cells, BHK-21 cells, CHO cells, HeLa cells, NS-1 cells MRC-5 cells, WI-38 cells, BHK cells, 293 cells, mouse mammary carcinoma cells, rat mammary carcinoma cells, HEK cells, HEPA cells, and RK-cells. In a preferred embodiment of the present invention, the cells cultivated are selected from the group, consisting of mouse mammary carcinoma cells, rat mammary carcinoma cells, HEK cells, HEPA cells, and HeLa cells.

The cells can be cultivated in any suitable medium known in the art under any suitable conditions, e.g. $CO_2$ content, temperature, or pH known in the art. The medium used for cultivation the cells may be a synthetic medium, such as DMEM, HAM's F12, Medium 199 or RPMI, or combinations thereof, and others that are known from the literature or are commercially available, which may be supplemented with animal proteins, for example by supplementing it with fetal calf serum or bovine serum. The basal medium can comprise a number of ingredients, including amino acids, vitamins, organic and inorganic salts, sources of carbohydrate, each ingredient being present in an amount which supports the cultivation of a cell in vitro. For example, DMEM/HAM's F12 (1:1) medium as basal medium can be used. The medium may contain auxiliary substances, such as buffer substances like sodium bicarbonate, oxidation stabilizers, stabilizers to counteract mechanical stress, or protease inhibitors.

The term "cultivation," in its various grammatical forms, refers to the maintenance of the cells in vitro under conditions permissive for growth and continued viability. Mammalian cells are typically cultivated in a cell incubator at about 37° C., with the culture medium having an optimal pH in the range of about 6.8 to 7.6, preferably between 7.0 and 7.3. Cells might have a complete medium change about every 2 to 3 days, or more or less frequently, if required. Cultivation approaches can include, depending on context and need, the sub-cultivation, passaging and propagation of the cells.

In a preferred embodiment of the present invention, at least one superhydrophilic area of the patterned modified surface provided in step (I) of the method for cultivating cells as defined herein contain at least one biologically active agent. The term "biologically active agent" as defined herein refers to any substance which does not prevent any biological tests carried out in the superhydrophilic areas. The biologically active agent may be an agent selected from the group consisting of nucleic acid molecules, like plasmids, DNA, RNA, iRNA, small molecules, macromolecules, drugs, proteins, peptides, tissue samples, polymers, hydrogels, particles, nanoparticles such as metal nanoparticles, semiconductor quantum dots, metal, carbon or polymer nanotubes and combinations thereof. In another embodiment, a biologically active agent as defined herein may be a substance suitable for binding a biomolecule or a cell to the superhydrophilic area, like for example an antibody or a fragment thereof or a ligand or a biomolecule. In a particularly preferred embodiment of the present invention, the biologically active agent is an antibody or a fragment thereof or a ligand binding to a surface molecule of a cell as defined herein.

In a more preferred embodiment of the present invention, a biologically active agent is a nucleic acid molecule, more preferably a nucleic acid molecule being selected from the group consisting of DNA, RNA, and iRNA agents. In a particularly preferred embodiment of the present invention, the biologically active agent is a nucleic acid and at least one cell as defined herein is transfected with the nucleic acid after the seeding step (II) and before the cultivating step (III), i.e. prior to cultivation in the superhydrophilic area. In a more preferred embodiment, the nucleic acid encodes a gene product which provides the cell being transfected with the nucleic acid with a detectable feature upon expression by the cell. In another preferred embodiment of the present invention, the nucleic acid is an iRNA agent and the expression of the gene product targeted by the iRNA agent is significantly decreased after transfection of the cell with the iRNA agent.

In yet another preferred embodiment of the present invention, the method for cultivating cells further comprises a step of (IV) detecting cells transfected with at least one iRNA agent. In one embodiment of the present invention, the cultivated cells are detected before the seeding step (II), before the cultivating step (III), during the cultivating step (III) and/or after the cultivating step (III) of the method for cultivating cells as defined herein. The detection can be carried out for example by detecting a peptide and/or nucleic acid indicating the cell. The peptide and/or nucleic acid may be expressed by the cell. In a preferred embodiment of the present invention, the peptide and/or nucleic acid using a compound binding to the peptide and/or nucleic acid having a detectable label. In one embodiment of the present invention, the compound having a detectable label is a nucleic acid biologically active agents binding specifically to a nucleic acid isolated from a cultivated cell. In another preferred embodiment of the present invention, the compound having a detectable label is an antibody or antibody fragment binding specifically to a peptide isolated from or presented on the surface of a cultivated cell.

In one embodiment of the present invention, the detection of the cultivated cell is carried out before the cultivating step (III) and the detection enables the counting of the cells. Using the information obtained by counting the cells, a predetermined number of cells is seeded into the superhydrophilic areas.

The term "detectable label" does not exhibit any particular limitation and may be selected from the group consisting of radioactive labels, fluorescent dyes, compounds having an enzymatic activity, magnetic labels, antigens, and compounds having a high binding affinity for a detectable label. For example, a radioactively or fluorescently labeled compound can be used to detect nucleic acids or peptides isolated from or being presented on the cultivated cells, e.g. after electrophoresis. Fluorescent dyes linked to a probe may serve as a detection label for nucleic acids, e.g. in a real-time PCR. A substance having an enzymatic reactivity such as the enzyme luciferase which produces a light signal upon contact with the respective substrate can also be used as a detectable label which may be linked covalently to said compound having a detectable label. Labeling the compound of the present invention with magnetic beads allows a selective extraction of nucleic acids or peptides isolated from or being presented on the cultivated cells. Coupling a compound having a detectable label to an antigen allows the detection of the compound by an antibody/enzyme-complex (the enzyme being e.g. phosphatase) catalyzing a detectable color reaction when using a suitable substrate. A substance with a high binding affinity for a different detectable label such as biotin which binds to a detectable label covalently linked to e.g. streptavidine, is a further possibility for making a compound of the present invention detectable.

The detection step (IV) of the above-defined method may comprise one or more detection method(s) selected from the group consisting of immunoblotting, immunoprecipitation, immunocapture, monoclonal antibody immobilization of platelet antigens or enzyme linked immuno sorbent assay (ELISA), flow cytometry, protein array technology, spectroscopy, mass spectrometry, chromatography, surface plasmonic resonance, fluorescence extinction and/or fluorescence energy transfer. The detection method can, for example, be selected from the group consisting of an enzyme assay, a chromogenic assay, a lumino assay, a fluorogenic assay, and a radioimmune assay. The reaction conditions to perform detection of the detectable label depend upon the detection method selected. It is within the knowledge of the person skilled in the art to choose the optimal parameters, such as buffer system, temperature and pH for the respective detection system to be used.

In a preferred embodiment of the present invention, the method for cultivating cells as defined herein comprises the step of bringing the cell into contact with a biologically active agent, preferably a pharmaceutically effective substance during or before the seeding step (II) and/or during the cultivating step (III) and detecting the influence of a treatment with a biologically active agent on the cells cultivated in the cultivating step (III). The biologically active agent compound according to the present invention can be any biologically active agent known in the art. In one preferred embodiment of the present invention, the biologically active agent is deposited in superhydrophilic areas of the patterned modified surface of the present invention before the seeding step (II) and the cells are brought into contact with the biologically active agent during the seeding step (II). In another preferred embodiment of the present invention, the cells are brought into contact with the biologically active agent during the cultivating step (III). The influence of a treatment with a biologically active agent on the cells can be detected by detecting alterations of the cell culture, preferably alterations in the morphology of cells, behavior of cells, such as motility, division, proliferation, adhesion, differentiation, expression of peptides and/or nucleic acids using the detection methods defined above. In a preferred embodiment of the alterations of the cell culture are detected using microscopy.

In a particularly preferred embodiment of the present invention, the influence of a treatment with the biologically active agent on the cells is detected by measuring differences in the gene expression profile of the cells. The term "gene expression profile" as used herein refers to the relative expression of a plurality of mRNA transcripts or post-transcriptional level including protein amounts and post-translational modifications. A gene expression profile of a cell reflects the amount of each mRNA transcript and/or post-transcriptional level in the starting sample. Methods for analyzing the gene expression profile of a cell are known in the art. In a preferred embodiment of the present invention the gene expression profiles of the cells is obtained using e.g. microarray techniques, PCR, microscopy or Northern-analysis. In a particularly preferred embodiment of the present invention, the biologically active agent is an iRNA agent.

In a preferred embodiment of the present invention, the seeding of cells to be cultivated into at least one superhydrophilic area of the patterned modified surface in step (II) is a seeding of cells to be cultivated onto the whole surface.

In another preferred embodiment of the method for cultivating cells as defined herein, the at least one biologically active agent is a nucleic acid molecule, preferably selected from the group consisting of iRNA, plasmids, DNA, and the method further comprises the step of (IV) detecting cells transfected with at least one nucleic acid molecule.

In a preferred embodiment of the present invention, the patterned modified surface is used for patterning standardized high-density cell arrays. Those can be used for routine combinatorial high-throughput (CHT) iRNA-screens or for any other cell-screening experiments that involve large biomolecule-libraries.

The transfection of cell clusters on an array can be for example reverse transfection. In a particularly preferred embodiment of the present invention, the patterned modified surface is preprinted with transfection reagents before the seeding step of the above described method for cultivating cells.

The method according to the present invention thus represents an extremely fast, optionally initiator-free method for modifying superhydrophobic surfaces. The reactive superhydrophobic surfaces can be easily modified upon photoinduced click-reactions so as to produce superhydrophobic surfaces having patterns of different chemical functionalities or physical properties. These can be used as self-cleaning coatings, anti-fouling coatings, or slippery coatings.

The method can be applied to a variety of different functional molecules, according to which functional and/or reactive superhydrophobic and superhydrophilic patterns can be created in very short time, even under aqueous conditions, making this method particularly useful for biological applications, where rapid transformation and benign aqueous conditions are crucial.

Further, the modified surface according to the present invention can be used to easily and conveniently prepare droplet microarrays, hydrogel microarrays and cell microarrays, in which cross contamination as well as cell migration between adjacent spots can be surprisingly minimized, while allowing high data-quality and investigation with common screening techniques. In addition, the modified surface according to the present invention is mechanically stable and does not degrade within a reasonable time-span, while being produced efficiently, particularly in short time and allowing the spot geometry, size and density to be precisely controlled.

The present invention will now be further illustrated in terms of the following additional experimental data without being limited thereto.

Examples

Materials and Methods

2-Hydroxyethyl methacrylate (HEMA) and ethylene dimethacrylate (EDMA) were purchased from Sigma-Aldrich (Germany) and purified using a short column filled with basic aluminum oxide to get rid of the inhibitors. The food dyes used in FIG. 5 were obtained from August Thomsen Corp. (USA). All the other chemicals were purchased from Sigma-Aldrich (Germany) and used without further purification. HeLa-GFP cells were purchased from Biocat (Germany). The GFP-peptide containing thiol group (fluorescein-β-Ala-GGGGC) was obtained from Dr. Cornelia Lee-Thedieck at the Institute of Functional Interfaces at Karlsruhe Institute of Technology. Schott (Germany) Nexterion Glass B UV transparent glass plates were used as substrates for polymer layers. The polymerizations and photografting were carried out on an OAI Model 30 deep-UV collimated light source (San Jose, Calif.) fitted with an USHIO 500 W Hg-xenon lamp (Japan).

Characterization

SEM images were obtained using the LEO 1530 Gemini scanning electron microscope (Zeiss, Germany) at the Institute of Nanotechnology (INT), KIT. The accelerating voltage was 5 kV for the measurement. Before SEM measurement, the samples were sputtered with a 30 nm gold layer using a Cressington 108 auto sputter coater (INT, KIT). The Raman spectra were obtained by a Bruker Senterra confocal Raman-microscope (Bruker Optics, Ettlingen, Germany) at the Institute of Functional Interfaces (IFG), KIT which provides a frequency doubled NdYAG Laser λ=532 nm, P=20 mW as excitation source. The distributions of cysteamine fragments and perfluorinated fragments on the surface were confirmed by time of flight secondary ion mass spectrometry (ToF-SIMS) (ION TOF Inc., Münster, Germany), IFG, KIT. The inverse patterns filled with Rhodamine dye solution were imaged using a Leica Confocal Microscope SPE. The fluorescein-peptide pattern and Hela-GFP cells were imaged on a Keyence BZ-9000 fluorescent microscope (Japan).

Water contact angles were measured using the sessile drop method with a home-built water contact angle measurement device. Static water contact angle and dynamic water contact angles (advancing water contact angle and receding water contact angle) on the surfaces were measured. For the static water contact angle measurement, 3 μL of deionized water was used. For the advancing and receding water contact angle measurements, the increasing or decreasing rate of the water volume was controlled with a syringe pump (Microliter Flow Modular Pump Component; Harvard Apparatus, Inc. US.) and set at 12 μL/min. Pictures of the water droplets on the surface were taken with a UK 1115 digital camera from EHD imaging (Germany). Image J software with the Dropsnake plug-in was used to analyze the images. The reported water contact angle values are the average of at least three WCA values from individual experiments. ImageJ software with a 3D Viewer plugin was used to create 3D images from Confocal Microscope SPE data.

Preparation of 12.5 μm-Thin Porous HEMA-EDMA Films

The procedure to make nanoporous HEMA-EDMA polymer layers as published in Reference [1] was employed. Briefly, two 12.5 μm-thin strips of Teflon film (American Durafilm Co.) were placed at the edges of one 3-(trimethoxysilyl)propyl methacrylate modified glass-plate (25×75×1 mm, width×length×thickness) and one fluorinated glass slide was clamped on top of it. 70 μL of polymerization mixture of HEMA (24 wt. %), ethylene dimethacrylate (EDMA) (16 wt. %), 1-decanol (12 wt. %), cyclohexanol (48 wt. %) and 2,2-dimethoxy-2-phenylacetophenone (DMPAP) (photoinitiator, 1 wt. % with respect to monomers) was injected in the mold between the glass slides and irradiated for 15 min with 12.0 mW·cm$^{-2}$ 260 nm UV-light. The mold was then carefully opened using a scalpel. The resulting non-porous superficial surface was removed by applying and rapidly removing adhesive film ("Scotch tape") after separating the plates while the layer was still wetted. A homogeneous porous surface was formed. The plate was washed extensively with ethanol and kept in ethanol for some minutes.

The resulting HEMA-EDMA polymer layer has high surface roughness (50% porosity and 80 to 250 nm pores based on SEM, (FIG. 3) and is highly wettable with static ($\theta_{st}$), advancing ($\theta_{adv}$) and receding ($\theta_{rec}$) WCAs close to ~4.2°, 7.1° and 0°, respectively Preparation of 12.5 μm-Thin Non-Porous HEMA-EDMA Films Two 12.5 μm-thin strips of Teflon film (American Durafilm Co.) were placed at the edges of one 3-(trimethoxysilyl) propyl methacrylate modified glass-plate (25×75×1 mm, width×length×thickness) and one fluorinated glass slide was clamped on top of it. 70 μL of polymerization mixture of HEMA (60 wt. %), EDMA (40 wt. %) and 2,2-dimethoxy-2-phenylacetophenone (DMPAP) (photoinitiator, 1 wt. % with respect to monomers) was injected in the mold between the glass slides and irradiated for 15 min with 12.0 mW·cm$^{-2}$ 260 nm UV-light. The mold was then carefully opened using a scalpel. The resulting non-porous surface was washed extensively with ethanol and kept in ethanol for some minutes.

Preparation of Alkyne Modified HEMA-EDMA

Two glass plates coated with a HEMA-EDMA layer were immersed into 50 mL of dichloromethane solution containing 4-pentynoic acid (111.6 mg, 1.14 mmol) and catalyst 4-(dimethylamino)pyridine (DMAP) (56 mg, 0.46 mmol). Then, the coupling reagent N,N'-diisopropylcarbodiimide (DIC) (176.5 μL, 1.14 mmol) was added to the solution cooled to about 0° C., followed by stirring the solution at room temperature for 4 hours. The plates were then washed extensively with acetone and kept in ethanol for several minutes, followed by drying.

Figure 8:
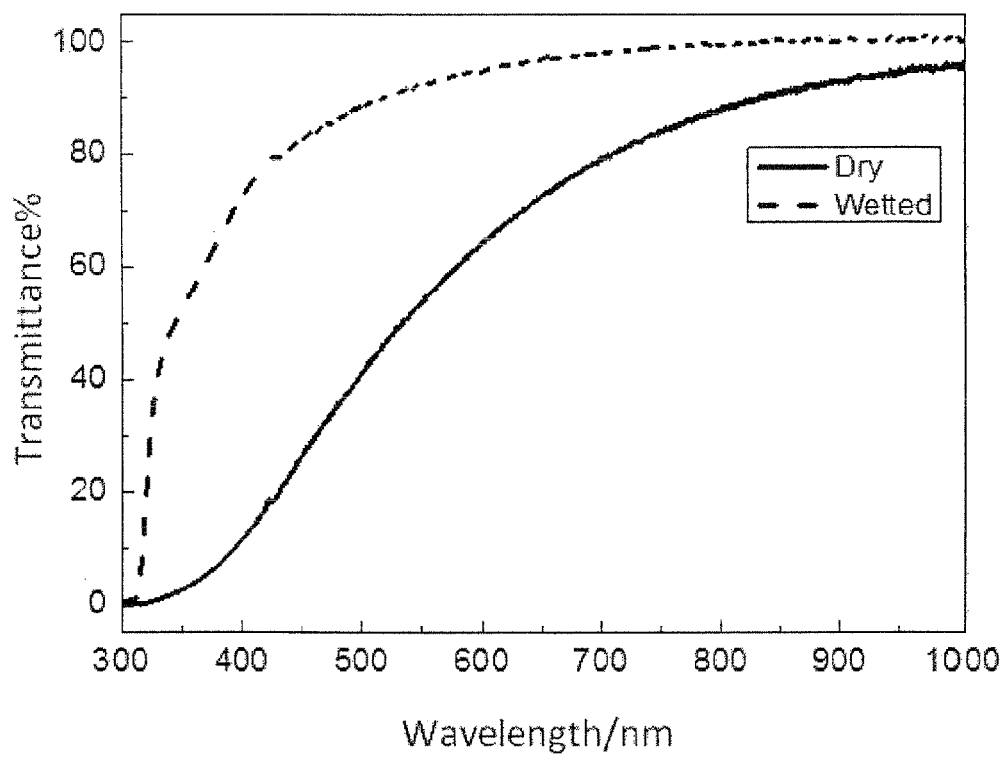
FIG. 8: UV-Vis-NIR transmittance spectra of wetted and dry porous HEMA-EDMA.

The analysis of the WCA variation over time and within the depth of the polymer film verifies that the modification proceeds completely throughout the thickness of the polymer layer after 4 hours of the reaction time, as it is shown in FIG. 13. The $\theta_{st}$ of the polymer surface increases from 4.2° to 124° after the esterification. The intense peak at 2120 cm$^{-1}$ in the Raman spectrum (FIG. 15) also confirms the presence of terminal alkyne groups at the polymer surface. After surface modification, the polymer layer maintains its nanoporous structure and no significant change of the morphology can be detected, as it is demonstrated by the SEM pictures shown in FIG. 3. Due to the small size of the pores, the light scattering on the wetted polymer layer is reduced leading to more than 90% transmittance of visible light, as it is shown in FIG. 8.

Preparation of Alkene Modified HEMA-EDMA

Two glass plates coated with a HEMA-EDMA layer were immersed into 50 mL of dichloromethane solution containing chloro(dimethyl)vinylsilane (0.2 mL), triethylamine (1 mL) and catalyst 4-(dimethylamino)pyridine (DMAP) (56 mg, 0.46 mmol). Then, the mixture was stirred at room temperature for 30 s. The plates were then washed extensively with acetone and kept in ethanol for several minutes, followed by drying.

Thiol-Yne and Thiol-Ene "Click" Reactions on the Porous Polymer Layer

According to the solubility of a thiol, 1-dodecanethiol (5 vol %) and 1H,1H,2H,2H-perfluorodecanethiol (5 vol %) were dissolved in acetone, while 2-mercaptoethanol (15 vol %), cysteamine hydrochloride (15 wt %), and 3-mercaptopropionic acid (15 vol %) were dissolved in ethanol. These thiol solutions were not degassed prior to use.

The porous alkyne polymer layer was wetted with the respective thiol solution and covered with a fluorinated quartz slide (25×75×1 mm, width×length×thickness). All of the fabrications of superhydrophobic or superhydrophilic layers using thiol-yne or thiol-ene reactions were performed by UV irradiation (12.0 mW·cm$^{-2}$, 260 nm) without photoinitiator under ambient laboratory conditions. After the reactions, the samples were washed extensively with acetone and dried with a nitrogen gun.

To study the kinetics of the thiol-yne or thiol-ene reactions on the alkyne or alkene polymer layer, polymer layers were wetted with a respective thiol solution, covered with a fluorinated quartz slide and irradiated with UV light for different times. Time exposures of UV light were controlled by a time-controller (OAI 150 Exposure Timer). The minimum exposure time is 0.1 s. After the reaction, the samples were washed extensively with acetone and dried with a nitrogen gun. Then static WCAs of the polymer surfaces were measured.

Several kinetic studies are shown in FIGS. 17a, 17b, and 17c, wherein the surface modification of the alkyne functionalized porous polymer layer using the photoinduced thiol-yne reactions are given. The static WCAs ($\theta_{st}$) of the polymer layer are analyzed upon modification using: (in FIG. 17a) cysteamine with (★) or without (■) photoinitiator DMPAP and with DMPAP but without UV irradiation (●); (in FIG. 17b) cysteamine (■), 3-mercaptopropionic acid (●), 2-mercaptoethanol (♦), 1H,1H,2H,2H-perfluorodecanethiol (▼), and 1-dodecanethiol (▲) without DMPAP upon UV irradiation.

As can be taken from these results, the same reaction without the photoinitiator requires only 5 s for the surface modification of the alkyne functionalized porous polymer layer and no reaction occurs without UV light. Without UV irradiation, the WCAs of the surface does not change at all even in the presence of the photoinitiator, indicating that there is no physisorption of the thiols on the surface. FIG. 16b shows the fast kinetics of the method according to the present invention in which an initiator-free surface modification can be carried out. In addition, the ability to use different thiols to create either superhydrophobic or superhydrophilic surfaces is demonstrated by the results shown in FIG. 17b.

Moreover, the modification of the surface with hydrophobic 1-dodecanethiol or 1H,1H,2H,2H-perfluorodecanethiol endows the porous surface with superhydrophobicity ($\theta_{adv}$, $\theta_{st}$ and $\theta_{rec}$ are as high as 171°, 169° and 162°, or 173°, 170°, and 164°, respectively). In the Raman spectra, sharp decline of the alkyne bands at approximately 2120 cm$^{-1}$ is observed, as it is shown in FIG. 4. No sign of the vinyl sulfide species, which would result in a signal at approximately 1657 cm$^{-1}$ is detected, as it is shown in FIG. 17*c*, indicating full conversion of the alkyne groups to the 1,2-dithioether adduct.

To test the ability to use the thiol-yne-based surface functionalization in different solvents, the surface of the alkyne functionalized porous polymer layer has been modified by using 3-mercaptopropionic acid dissolved in several common solvents, as it is shown in FIG. 19. Based on the water contact angle measurements, the reaction proceeded within 5 s in ethanol, acetone, ethyl acetate, DCM, THF and water. The initially hydrophobic alkyne-modified porous polymer layer has been modified into the superhydrophilic surface after only 5 s of UV irradiation without using a photoinitiator. The reaction in DMF and DMSO requires 15 s of the UV irradiation to make the surface superhydrophilic.

In order to show the effect of the porosity on fabricating the superhydrophilic and superhydrophobic surfaces, using the thiol-yne reaction under the same conditions as described in the kinetic studies shown in FIG. 17, the functionalization of an alkyne-modified non-porous HEMA-EDMA surface with cysteamine leads to a decrease of $\theta_{st}$ from 63° to 44° and the functionalization with 1H,1H,2H,2H-perfluorodecanethiol leads to an increase of $\theta_{st}$ from 63° to 110° after 5 s UV irradiation.

Preparation of Superhydrophobic-Superhydrophilic Micropatterns Via Click Photopatterning A typical example for the preparation of superhydrophobic-superhydrophilic micropatterns using subsequent thiol-yne reactions is presented. First, the porous alkyne polymer layer was wetted with acetone solution containing 5 vol % 1H,1H,2H,2H-perfluorodecanethiol, covered by a fluorinated quartz slide, and irradiated by UV light through a photomask for 15 s. After removing the photomask, washing with acetone and drying, the polymer layer was wetted with an ethanol solution containing 15 wt. % cysteamine hydrochloride and irradiated by UV light for another 15 s. Finally, the plate was washed extensively with acetone and dried with a nitrogen gun.

After the first reaction, the exposed fluoro-surface showed superhydrophobicity with $\theta_{st}$, $\theta_{adv}$ and $\theta_{rec}$ as high as 170°, 173°, and 164°, respectively, while the $\theta_{st}$ of unexposed alkyne functionalized areas were maintained at 124°. After the second reaction with cysteamine, the $\theta_{st}$ on the alkyne areas reduced to 4.4°. As for the fluorinated areas, the receding WCA decreased by only 2°, while the advancing WCA did not change at all and the surface maintained superhydrophobicity, confirming almost completeness of the reaction of the first step.

To further improve this method and to avoid possible modification of the residual alkyne groups remaining after the first modification step, an ethanol-water (1:1) solution was used instead of pure ethanol to dissolve cysteamine. In this case, the contact angle ($\theta_{st}$) of the ethanol-water solution on the alkyne-functionalized and the fluorinated (=superhydrophobic) surfaces was 0° and 135±3°, respectively. Thus, the cysteamine solution can only wet the alkyne-functionalized areas having $\theta_{st}$=0°, while the fluorinated areas remain dry, as it is shown in FIG. 20. This simple method completely prevents immobilization of the thiol compound on the superhydrophobic areas during the second modification step, as it is also confirmed by time-of-flight secondary ion mass spectrometry (ToF-SIMS) (see FIG. 21A).

Preparation of Inverse Patterns

Patterns with superhydrophobic spots and superhydrophilic barriers were created by switching the order of the thiols used for functionalization and using the same method and the same photomask (see FIGS. 21B and 21C).

Using the Thiol-Yne Patterning Method for Creating Peptide Patterns

The alkyne HEMA-EDMA porous layer was first wetted with a 9/1 water/ethanol solution. Then, the plate was washed extensively with pure water to replace the ethanol-water solution with water. Excess of water was removed from the surface and 10 μL of the aqueous peptide solution (fluorescein-β-Ala-GGGGC, 0.25 mg/mL) was dropped on the surface. The substrate was covered with a fluorinated quartz slide and a photomask. The polymer layer was then irradiated with UV light through a photomask for 15 s (6 mW/cm$^2$, 260 nm). Then, the plate was washed extensively with ethanol and dried with a nitrogen gun (see FIG. 22).

Cell Microarray

Hela-GFP cells were cultured in DMEM (Dulbecco's Modified Eagle's Medium) containing 10% of fetal bovine serum (FBS). A cell suspension was obtained by trypsinizing a confluent (80% monolayer) culture grown in a Petri dish in an incubator (37° C., 5% $CO_2$) for 2-3 days. For sterilization, the glass substrate with a superhydrophobic-superhydrophilic pattern was kept in ethanol for 20 min, dried in air, and placed in a 10 mL Petri dish. Then, 5 mL of cell-suspension was added so that the plate was fully covered (seeding density: 12100 cells·cm$^{-2}$). The seeded array was cultured in the incubator for 2 days.

Stability Test

In order to test the stability of the superhydrophobic and superhydrophilic surfaces of the micropattern, several conditions have been examined. In FIG. 23, the result of stability tests of superhydrophobic surfaces in air, PBS buffer, DMEM solution with 10% FBS, which is often used in cell culture, and both acetic (pH=5) and basic (pH=10) water solution environments for 120 hours are given. In FIG. 23A, static WCAs of superhydrophobic surfaces as a function of the incubation time in different environments is shown, indicating that the static WCAs of the surfaces in air, PBS buffer, and acetic and basic water solutions remain above 160° after 120 hours incubation. Due to the protein adsorption, the static WCA of the surface in DMEM+FBS solution decreases. In addition, in FIG. 23B, the advancing and receding WCAs of the surfaces after incubation for 120 hours in different environments is shown. The advancing WCAs almost remain the same after incubation. The receding WCAs of the surface in PBS buffer, acetic and basic water solutions decrease slightly.

Cell-Migration

Hela-GFP cells were seeded on an array of superhydrophilic spots and superhydrophobic barriers and incubated for 2 days. FIGS. 10 to 11 show that cells adhere well to the superhydrophilic microspots, demonstrating the biocompatibility and nontoxicity of the surface. However, less than 1% of cells occupies the superhydrophobic regions separating the microspot areas after 2 days of culture.

Preparation of the Transparent, Photo-Clickable and Superhydrophobic Surface

According to the present invention, oxygen plasma activated substrates were immersed in a coating solution consisting of toluene, vinyltrichlorosilane (~1000 ppm) and trace amount of water (~200 ppm). Upon immersion, the vinyltrichlorosilane undergoes a polycondensation process which leads to the formation of surface grafted 3D nanofilament on the substrates.

REFERENCE LIST

[1] F. L. Geyer, E. Ueda, U. Liebel, N. Grau, P. A. Levkin, *Angew. Chem. Int. Ed.* 2011, 50, 8424.

[2] E. Ueda, F. L. Geyer, V. Nedashkivska, P. A. Levkin, *Lab Chip* 2012, 12, 5218.
[3] a) J. Ziauddin, D. M. Sabatini, *Nature* 2001, 411, 107; b) E. Ueda, P. A. Levkin, *Adv. Healthcare Mater.* 2013, DOI: 10.1002/adhm.201300073.
[4] a) V. Jokinen, R. Kostiainen, T. Sikanen, *Adv. Mater.* 2012, 24, 6240; b) S. P. R. Kobaku, A. K. Kota, D. H. Lee, J. M. Mabry, A. Tuteja, *Angew. Chem. Int. Ed.* 2012, 51, 10109; c) H. Mertaniemi, V. Jokinen, L. Sainiemi, S. Franssila, A. Marmur, O. Ikkala, R. H. A. Ras, *Adv. Mat.* 2011, 23, 2911.
[5] W. Song, A. C. Lima, J. F. Mano, *Soft Matter* 2010, 6, 5868.
[6] a) S. Xing, R. S. Harake, T. Pan, *Lab Chip* 2011, 11, 3642; b) Y. Han, P. Levkin, I. Abarientos, H. Liu, F. Svec, J. M. J. Fréchet, *Anal. Chem.* 2010, 82, 2520; c) E. Ueda, P. A. Levkin, *Adv. Mater.* 2013, 25, 1234.
[7] a) K. Tadanaga, J. Morinaga, A. Matsuda, T. Minami, *Chem. Mater.* 2000, 12, 590; b) X. Zhang, H. Kono, Z. Liu, S. Nishimoto, D. A. Tryk, T. Murakami, H. Sakai, M. Abe, A. Fujishima, *Chem. Commun.* 2007, 46, 4949; c) G. Kwak, M. Lee, K. Yong, *Langmuir* 2010, 26, 9964; d) X. Zhang, M. Jin, Z. Liu, D. A. Tryk, S. Nishimoto, T. Murakami, A. Fujishima, *J. Phys Chem C* 2007, 111, 14521; e) Y. Lai, J. Huang, J. Gong, Y. Huang, C. Wang, Z. Chen, C. Lin, *J. Electrochem Soc* 2009, 156, D480; f) S. Nishimoto, H. Sekine, X. Zhang, Z. Liu, K. Nakata, T. Murakami, Y. Koide, A. Fujishima, *Langmuir* 2009, 25, 7226; g) Y. Lai, C. Lin, H. Wang, J. Huang, H. Zhuang, L. Sun, *Electrochem. Commun* 2008, 10, 387; h) S. Nishimoto, A. Kubo, K. Nohara, X. Zhang, N. Taneichi, T. Okui, Z. Liu, K. Nakata, H. Sakai, T. Murakami, M. Abe, T. Komine, A. Fujishima, *Appl. Surf. Sci.* 2009, 255, 6221; i) K. Nakata, S. Nishimoto, Y. Yuda, T. Ochiai, T. Murakami, A. Fujishima, *Langmuir* 2010, 26, 11628; j) T. Ishizaki, N. Saito, O. Takai, *Langmuir* 2010, 26, 8147.
[8] S. J. Pastine, D. Okawa, B. Kessler, M. Rolandi, M. Llorente, A. Zettl, J. M. J. Frechet, *J. Am. Chem. Soc.* 2008, 130, 4238.
[9] a) L. Sainiemi, V. Jokinen, A. Shah, M. Shpak, S. Aura, P. Suvanto, S. Franssila, *Adv. Mater.* 2011, 23, 122; b) V. Jokinen, L. Sainiemi, S. Franssila, *Adv. Mater.* 2008, 20, 3453; c) R. P. Garrod, L. G. Harris, W. C. E. Schofield, J. McGettrick, L. J. Ward, D. O. H. Teare, J. P. S. Badyal, *Langmuir* 2007, 23, 689.
[10] a) L. Zhai, M. C. Berg, F. Ç. Cebeci, Y. Kim, J. M. Milwid, M. F. Rubner, R. E. Cohen, *Nano Lett.* 2006, 6, 1213; b) J. S. Li, E. Ueda, A. Nallapaneni, L. X. Li, P. A. Levkin, *Langmuir* 2012, 28, 8286; c) Y. Lai, F. Pan, C. Xu, H. Fuchs, L. Chi, *Adv. Mater.* 2013, 25, 1682.
[11] S. M. Kang, I. You, W. K. Cho, H. K. Shon, T. G. Lee, I. S. Choi, J. M. Karp, H. Lee, *Angew. Chem. Int. Ed.* 2010, 49, 9401.
[12] D. Zahner, J. Abagat, F. Svec, J. M. J. Fréchet, P. A. Levkin, *Adv. Mater.* 2011, 23, 3030.
[13] U. Manna, A. H. Broderick, D. M. Lynn, *Adv. Mater.* 2012, 24, 4291.
[14] a) R. Hoogenboom, *Angew. Chem. Int. Ed.* 2010, 49, 3415; b) B. D. Fairbanks, T. F. Scott, C. J. Kloxin, K. S. Anseth, C. N. Bowman, *Macromolecules* 2008, 42, 211; c) N. S. Bhairamadgi, S. Gangarapu, M. A. Caipa Campos, J. M. J. Paulusse, C. J. M. van Rijn, H. Zuilhof, *Langmuir* 2013, 29, 4535.
[15] a) R. M. Hensarling, V. A. Doughty, J. W. Chan, D. L. Patton, *J. Am. Chem. Soc.* 2009, 131, 14673; b) A. Massi, D. Nanni, *Org. Biomol. Chem.* 2012, 10, 3791.
[16] M. Guerrouache, S. Mahouche-Chergui, M. M. Chehimi, B. Carbonnier, *Chem. Commun.* 2012, 48, 7486.
[17] a) B. Neumann, T. Walter, J. K. Heriche, J. Bulkescher, H. Erfle, C. Conrad, P. Rogers, I. Poser, M. Held, U. Liebel, C. Cetin, F. Sieckmann, G. Pau, R. Kabbe, A. Wunsche, V. Satagopam, M. H. A. Schmitz, C. Chapuis, D. W. Gerlich, R. Schneider, R. Eils, W. Huber, J. M. Peters, A. A. Hyman, R. Durbin, R. Pepperkok, J. Ellenberg, *Nature* 2010, 464, 721-727; b) H. Erfle, B. Neumann, P. Rogers, J. Bulkescher, J. Ellenberg, R. Pepperkok, *J. Biomol. Screen.* 2008, 13, 575-580.
[18] H. Erfle, B. Neumann, U. Liebel, P. Rogers, M. Held, T. Walter, J. Ellenberg, R. Pepperkok, *Nature Protocols* 2007, 2, 392-399.

The invention claimed is:

1. A method for modifying a surface of a substrate to form a superhydrophobic surface at least on parts of the substrate, comprising
   a functionalization step of functionalizing at least the surface of the substrate by covalently binding an alkyne or alkene group-containing compound thereto to form an alkyne or alkene functionalized porous surface, wherein the alkyne or alkene group-containing compound represents a monomeric moiety; and
   a first modification step of modifying the alkyne or alkene functionalized porous surface by reacting the alkyne or alkene groups with at least one first compound selected from the group consisting of thiols, disulfides and tetrazoles, wherein the first modification step is carried out at least on parts of the alkyne or alkene functionalized porous surface of the substrate and under UV irradiation, wherein superhydrophobic areas on the surface are formed in the functionalization step and/or first modification step, and wherein the static water contact angle (WCA) ($\theta_{St}$) of the superhydrophobic areas on the surface is 150° or higher, and the contact angle hysteresis is 10° or less.

2. The method according to claim 1, wherein UV irradiation is carried out for 0.25 s to less than 30 min.

3. The method according to claim 1, wherein the superhydrophobic areas on the surface are at least formed in the functionalization step using an alkene group-containing compound, and wherein the at least one first compound, selected from the group consisting of thiols, disulfides and tetrazoles, used in the first modification step contains at least one functional moiety different from the alkene group-containing compound, thereby creating a pattern of superhydrophobic areas on the surface.

4. The method according to claim 3, wherein the alkene group-containing compound is a silicon-containing compound having at least one vinyl group.

5. The method according to claim 1, further comprising a second modification step of modifying unmodified areas of the alkyne or alkene functionalized surface by reacting unreacted alkyne or alkene groups with at least one second compound, selected from the group consisting of thiols, disulfides and tetrazoles, wherein the second modification step is carried out under UV irradiation on parts of the surface of the substrate not modified in the first modification step.

6. The method according to claim 5, wherein
   the first modification step of modifying the alkyne or alkene functionalized surface is carried out by reacting the alkyne or alkene groups with the first compound represented by the general formulae $R^1$-SH, $R^1$-S—S-$R_x$, or $R^1$-Tz-$R_x$ using a photomask, thereby creating a pattern of superhydrophilic areas on the surface, and the second modification step of modifying the unmodified areas of the alkyne or alkene functionalized surface is carried out by reacting the unreacted alkyne or alkene groups with the second compound represented by the general formulae $R^2$–SH, $R^2$—S—S–$R_x$, or $R^2$-Tz-$R_x$, thereby creating superhydrophobic areas on the surface, or the first modification step of modifying the alkyne or alkene functionalized surface is carried out by reacting the alkyne or alkene groups with the first compound represented by the general formulae $R^1$–SH, $R^1$–S—S—$R_x$, or $R^1$-Tz-$R_x$ using a photomask, thereby creating a pattern of superhydrophobic areas on the surface, and the second modification step of modifying the unmodified areas of the alkyne or alkene functionalized surface is carried out by reacting the unreacted alkyne or alkene groups with the second compound represented by the general formulae $R^2$–SH, $R^2$—S—S—$R_x$, or $R^2$-Tz-$R_x$, thereby creating superhydrophilic areas on the surface, wherein $R^1$, $R^2$ and $R_x$ represent either hydrophilic or hydrophobic residues and Tz represents a tetrazole moiety.

7. The method according to claim 6, wherein the hydrophilic residues represented by $R^1$ and $R^2$ are at least one member represented by the general formula Q-X, wherein Q represents a substituted or unsubstituted $C_1$-$C_6$ alkyl group, which may contain one or more hetero atoms selected from O, N, P and S, and X represents a (poly)hydroxy group, a (poly)amine group, a (poly)amide group, a (poly)carboxyl group or a sugar moiety.

8. The method according to claim 6, wherein the hydrophobic residues represented by $R^1$ and $R^2$ are at least one member of a substituted or unsubstituted, polyfluorinated or non-fluorinated, linear, branched or cyclic $C_6$-$C_{30}$ alkyl group, substituted or unsubstituted, polyfluorinated or non-fluorinated linear, branched or cyclic $C_6$-$C_{30}$ alkenyl group, substituted or unsubstituted, polyfluorinated or non-fluorinated $C_6$-$C_{30}$ aryl group.

* * * * *